United States Patent
Arai et al.

(10) Patent No.: US 12,484,788 B2
(45) Date of Patent: Dec. 2, 2025

(54) SYSTEM FOR ESTIMATING IMAGE RECOGNITION INFORMATION FROM AT LEAST IMAGES OF ENERGY DEVICE AND BIOLOGICAL TISSUE, COMPUTER-READABLE NON-TRANSITORY INFORMATION STORAGE MEDIUM, AND ENERGY OUTPUT ADJUSTMENT METHOD

(71) Applicant: OLYMPUS CORPORATION, Tokyo (JP)

(72) Inventors: Takeshi Arai, Musashino (JP); Hideyuki Kasahara, Hamura (JP); Masatoshi Iida, Hachioji (JP); Shinji Yasunaga, Higashimurayama (JP); Yoshitaka Honda, Hachioji (JP); Kazue Tanaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 245 days.

(21) Appl. No.: 18/234,168

(22) Filed: Aug. 15, 2023

(65) Prior Publication Data

US 2023/0380695 A1 Nov. 30, 2023

Related U.S. Application Data

(63) Continuation of application No. PCT/JP2022/009691, filed on Mar. 7, 2022.
(Continued)

(51) Int. Cl.
*A61B 5/00* (2006.01)
*A61B 18/04* (2006.01)
(Continued)

(52) U.S. Cl.
CPC ............ *A61B 5/0093* (2013.01); *A61B 18/04* (2013.01); *A61B 18/1445* (2013.01);
(Continued)

(58) Field of Classification Search
None
See application file for complete search history.

(56) References Cited

U.S. PATENT DOCUMENTS 8,398,541 B2 3/2013 DiMaio et al.
10,307,209 B1 6/2019 Yu
(Continued)

FOREIGN PATENT DOCUMENTS

EP 3505124 A1 7/2019
EP 3767535 A1 1/2021
(Continued)

OTHER PUBLICATIONS

International Search Report dated May 17, 2022 received in PCT/JP2022/009691.
(Continued)

*Primary Examiner* — Haris Sabah
(74) *Attorney, Agent, or Firm* — Scully, Scott, Murphy & Presser, P.C.

(57) ABSTRACT

The system includes a memory that stores first and second trained models, and a processor. The processor acquires a captured image in which at least one energy device and at least one biological tissue are imaged. The processor detects a bounding box from the captured image by processing based on the first trained model and estimates the image recognition information from the captured image in the bounding box by processing based on the second trained model. The processor outputs an energy output adjustment instruction based on the estimated image recognition information to the generator. The generator controls the energy
(Continued)

supply amount to the energy device based on the energy output adjustment instruction.

20 Claims, 34 Drawing Sheets

Related U.S. Application Data

(60) Provisional application No. 63/221,128, filed on Jul. 13, 2021, provisional application No. 63/222,252, filed on Jul. 15, 2021.

(51) Int. Cl.
| | |
|---|---|
| *A61B 18/14* | (2006.01) |
| *G06T 7/00* | (2017.01) |
| *G06T 7/11* | (2017.01) |
| *G06V 10/25* | (2022.01) |
| *G16H 30/40* | (2018.01) |
| *G16H 50/20* | (2018.01) |
| *A61B 17/00* | (2006.01) |
| *A61B 18/00* | (2006.01) |
| *G06V 10/70* | (2022.01) |

(52) U.S. Cl.
CPC .............. *G06T 7/0012* (2013.01); *G06T 7/11* (2017.01); *G06V 10/25* (2022.01); *G16H 30/40* (2018.01); *G16H 50/20* (2018.01); *A61B 2017/0042* (2013.01); *A61B 2018/00577* (2013.01); *A61B 2018/00702* (2013.01); *A61B 2018/00791* (2013.01); *A61B 2018/00898* (2013.01); *G06T 2207/10068* (2013.01); *G06T 2207/20081* (2013.01); *G06T 2207/30024* (2013.01); *G06V 10/70* (2022.01)

(56) References Cited

U.S. PATENT DOCUMENTS

| | | | |
|---|---|---|---|
| 10,786,298 B2 | 9/2020 | Johnson | |
| 12,146,931 B2 * | 11/2024 | Saha | G06T 7/136 |
| 2001/0044575 A1 * | 11/2001 | Hareyama | A61B 5/704 |
| | | | 600/411 |
| 2008/0082145 A1 | 4/2008 | Skwarek et al. | |
| 2013/0022170 A1 * | 1/2013 | Cho | A61B 6/482 |
| | | | 378/62 |
| 2013/0245375 A1 | 9/2013 | DiMaio et al. | |
| 2014/0296842 A1 | 10/2014 | Mansi et al. | |
| 2015/0272653 A1 | 10/2015 | Brunke et al. | |
| 2016/0287338 A1 | 10/2016 | Grady et al. | |
| 2016/0314601 A1 | 10/2016 | Sankaran et al. | |
| 2017/0079678 A1 | 3/2017 | Ishikawa | |
| 2017/0252095 A1 * | 9/2017 | Johnson | A61B 18/1445 |
| 2018/0160910 A1 | 6/2018 | Takahashi et al. | |
| 2018/0168734 A1 | 6/2018 | Strobl | |
| 2018/0199987 A1 | 7/2018 | Sugiyama | |
| 2019/0201074 A1 | 7/2019 | Yates et al. | |
| 2019/0201084 A1 | 7/2019 | Shelton, IV et al. | |
| 2019/0206565 A1 | 7/2019 | Shelton, IV | |
| 2019/0262076 A1 | 8/2019 | Brown | |
| 2019/0298398 A1 | 10/2019 | Wellman et al. | |
| 2019/0371474 A1 | 12/2019 | Borsic | |
| 2020/0078081 A1 | 3/2020 | Jayme et al. | |
| 2020/0197072 A1 | 6/2020 | Watson | |
| 2020/0265309 A1 | 8/2020 | Wham et al. | |
| 2020/0330144 A1 | 10/2020 | Moriwaki et al. | |
| 2021/0015554 A1 | 1/2021 | Chow et al. | |
| 2021/0038295 A1 | 2/2021 | Katsuragi et al. | |
| 2021/0038314 A1 | 2/2021 | Wibowo | |
| 2021/0085387 A1 | 3/2021 | Amit et al. | |
| 2021/0161588 A1 | 6/2021 | Fujisawa et al. | |
| 2021/0267544 A1 | 9/2021 | Saikou | |
| 2021/0401397 A1 | 12/2021 | Kruecker et al. | |
| 2022/0151721 A1 | 5/2022 | Haraguchi et al. | |
| 2022/0246307 A1 | 8/2022 | Nakamura | |
| 2023/0240512 A1 | 8/2023 | Arai et al. | |
| 2023/0404652 A1 | 12/2023 | Uchida et al. | |
| 2023/0410298 A1 | 12/2023 | Fujii et al. | |
| 2023/0419486 A1 | 12/2023 | Nishikawa et al. | |

FOREIGN PATENT DOCUMENTS

| | | |
|---|---|---|
| JP | H11-197159 A | 7/1999 |
| JP | 2018-511403 A | 4/2018 |
| JP | 2019-170809 A | 10/2019 |
| JP | 2020-146374 A | 9/2020 |
| JP | 2021-013722 A | 2/2021 |
| JP | 2021-029258 A | 3/2021 |
| JP | 2021-029979 A | 3/2021 |
| JP | 2021-049341 A | 4/2021 |
| JP | 2021-083969 A | 6/2021 |
| JP | 2021-083970 A | 6/2021 |
| JP | 2021-514724 A | 6/2021 |
| JP | 2021/188883 A | 12/2021 |
| WO | 2016/161293 A1 | 10/2016 |
| WO | 2017/090165 A1 | 6/2017 |
| WO | 2019134009 A1 | 7/2019 |
| WO | 2019/162809 A1 | 8/2019 |
| WO | 2020/031069 A1 | 2/2020 |
| WO | 2020/051444 A1 | 3/2020 |
| WO | 2020/095389 A1 | 5/2020 |
| WO | 2020/104308 A1 | 5/2020 |
| WO | 2021/039298 A1 | 3/2021 |
| WO | 2023/286334 A1 | 1/2023 |

OTHER PUBLICATIONS

K. Naruki, et al., "Proposal for Endoscope Robot with Surgical Scene Recognition using Image Processing", No. 16-2 Proceedings of the 2016 JSME Conference on Robotics and Mechatronics, Yokohama, Japan, Jun. 8-11, 2016, 1A2-02a1(1)-(4), DOI:https://doi.org/10.1299/jsmermd.2016.1A2-02a1.

U.S. Office Action dated Sep. 17, 2025 received in U.S. Appl. No. 18/368,100.

U.S. Office Action dated Sep. 25, 2025 received in U.S. Appl. No. 18/237,599.

* cited by examiner

FIG. 9
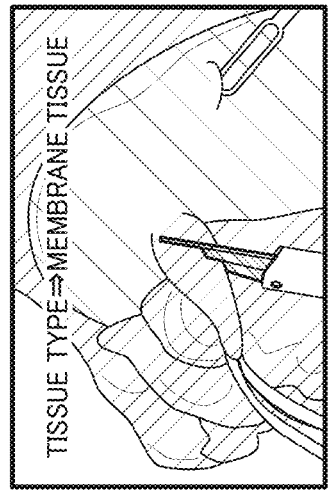
(A) TISSUE REGION RECOGNITION (segmentation)
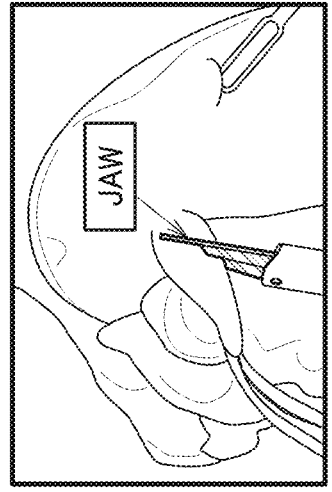
(B) TREATMENT TOOL DISTAL END REGION DETECTION (segmentation)
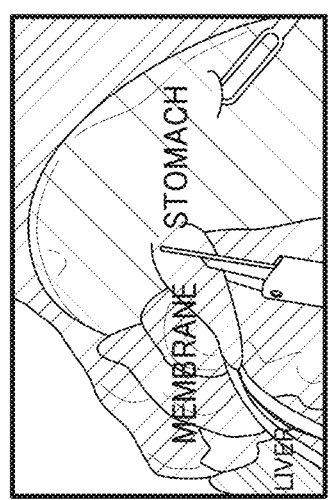
(A) + (B) TISSUE INFORMATION RECOGNITION
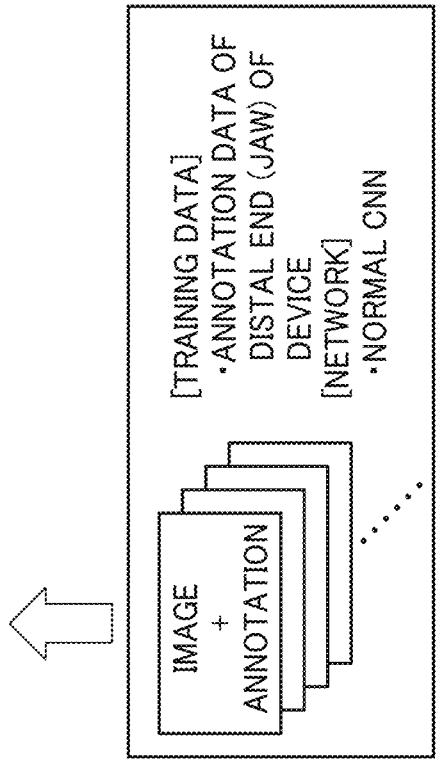
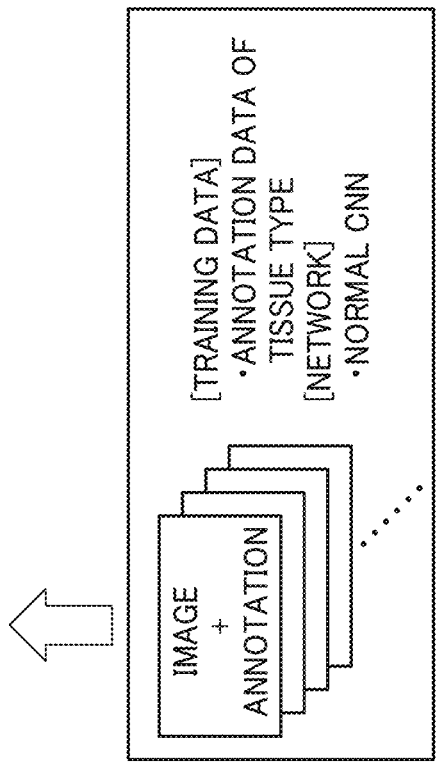

FIG.11

| TISSUE TYPE | OUTPUT ADJUSTMENT |
|---|---|
| TISSUE EASY TO CUT (E.G., THIN FILM) | REDUCE OUTPUT FROM THAT IN NORMAL CONDITION |
| TISSUE DIFFICULT TO CUT (E.G., ESOPHAGUS) | INCREASE OUTPUT FROM THAT IN NORMAL CONDITION |
| OTHER TISSUES | NO CHANGE FROM THAT IN NORMAL CONDITION |

FIG. 15
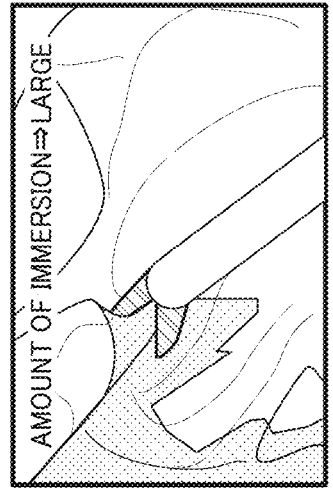
(A) + (B) TISSUE INFORMATION RECOGNITION
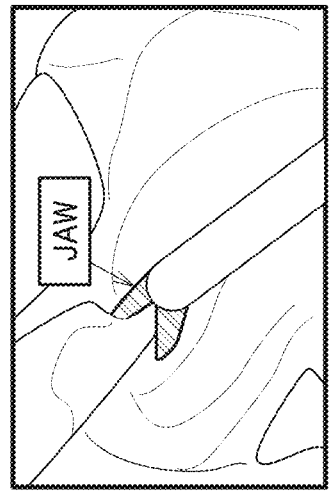
(B) TREATMENT TOOL DISTAL END REGION DETECTION (segmentation)
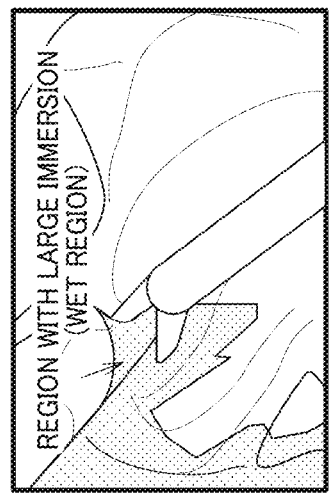
(A) TISSUE REGION RECOGNITION (segmentation)

FIG.17

| TISSUE CONDITION | OUTPUT ADJUSTMENT |
|---|---|
| TISSUE CONDITION EASY TO CUT (E.G., SMALL AMOUNT OF SURROUNDING TISSUE) | REDUCE OUTPUT FROM THAT IN NORMAL CONDITION |
| TISSUE CONDITION DIFFICULT TO CUT (E.G., LARGE AMOUNT OF FAT, LARGE AMOUNT OF IMMERSION IN BLOOD) | INCREASE OUTPUT FROM THAT IN NORMAL CONDITION |
| OTHER TISSUE CONDITIONS | NO CHANGE FROM THAT IN NORMAL CONDITION |

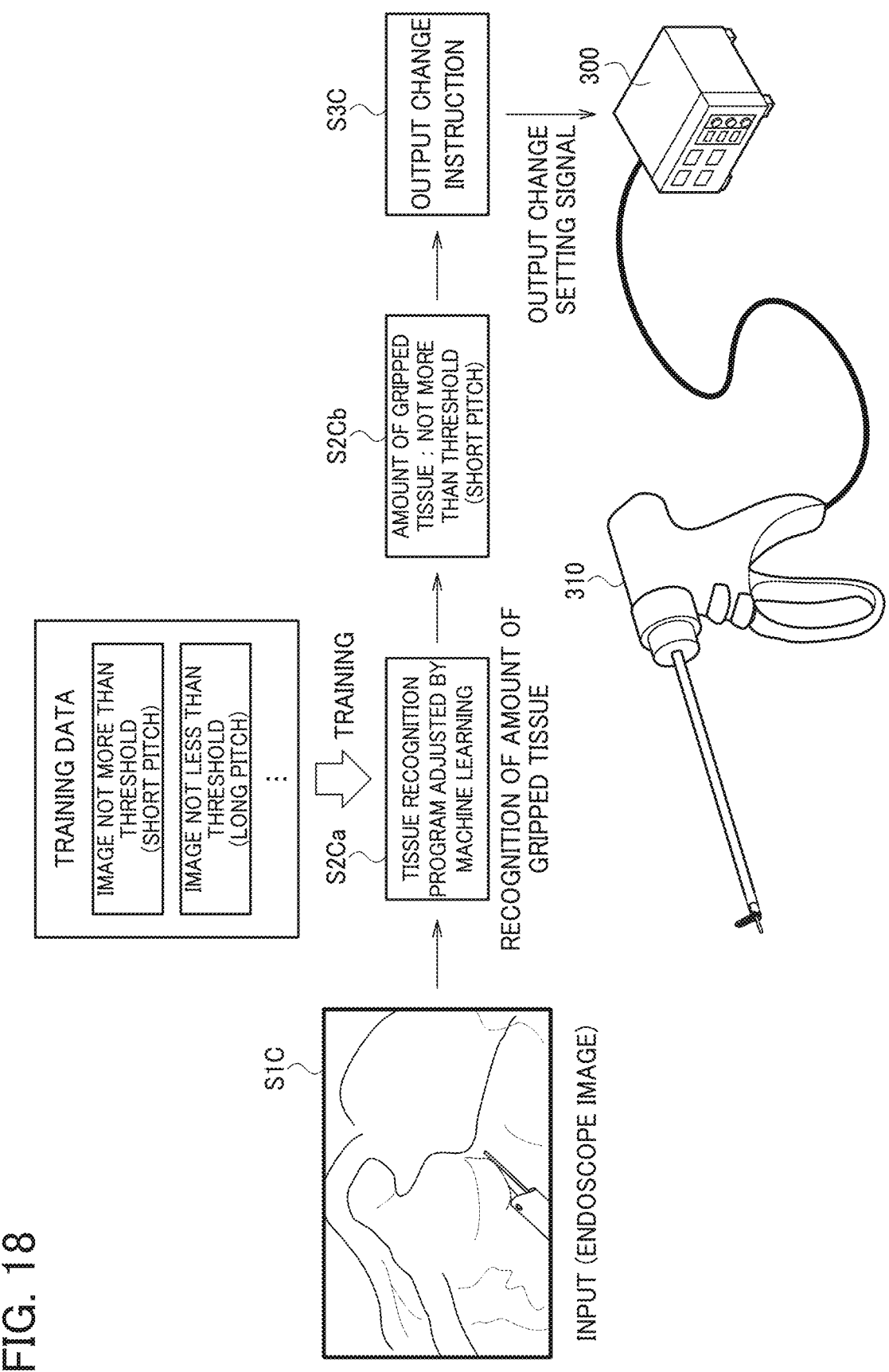

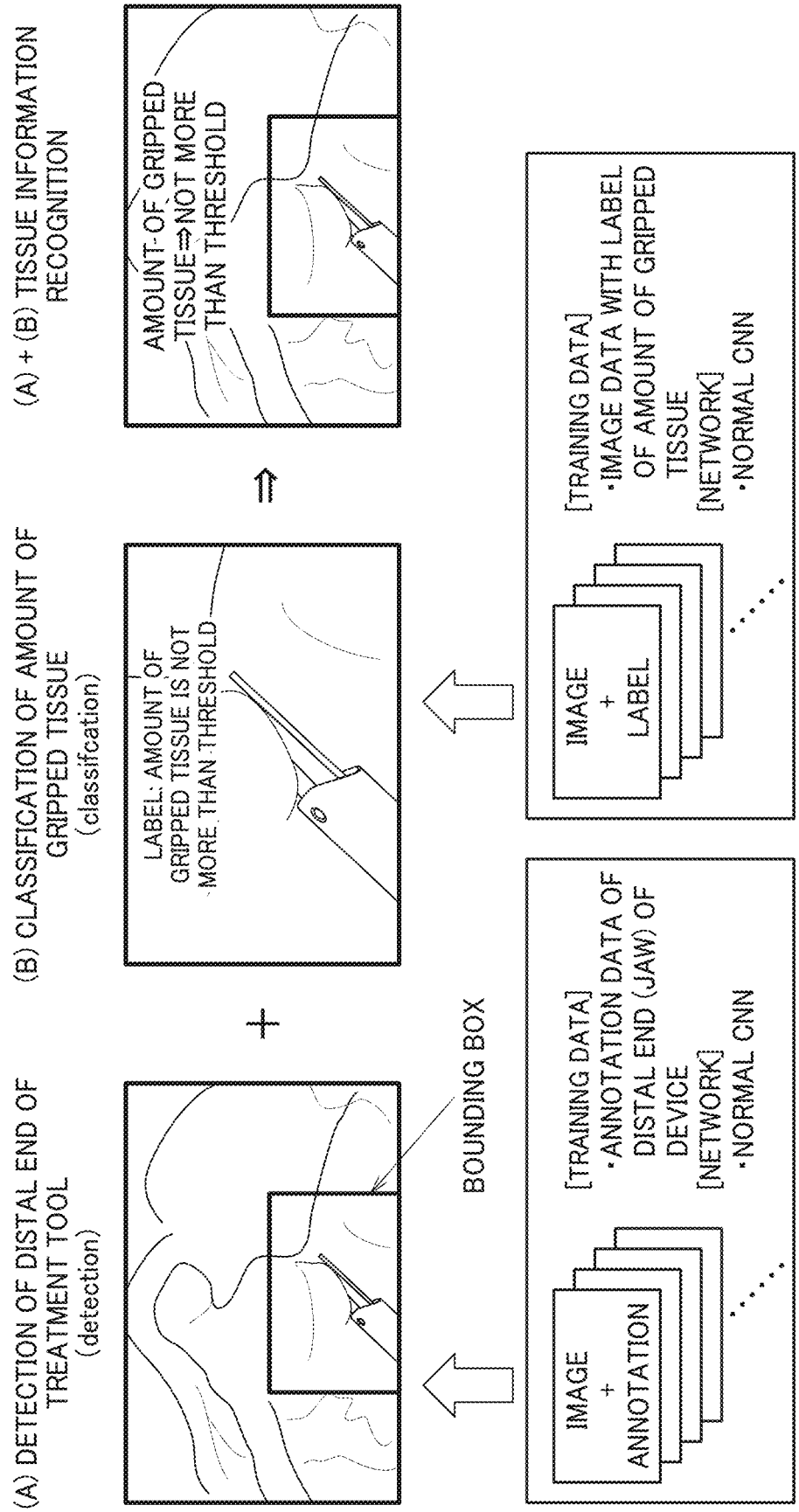

FIG. 20

QUANTITATIVE POSITIONAL RELATIONSHIP ESTIMATION
(classification or regression)

DISTANCE X FROM JAW BASE END SECTION TO GRIPPED TISSUE PROXIMAL END SECTION [mm]

[TRAINING DATA]
· IMAGE DATA WITH DISTANCE INFORMATION
· EXAMPLE OF DISTANCE INFORMATION: 5 MM, 10 MM, ETC.
[NETWORK]
· NORMAL CNN

IMAGE + DISTANCE INFORMATION

[TOTAL LENGTH OF JAW] − X = AMOUNT OF GRIPPED TISSUE
IS AMOUNT OF GRIPPED TISSUE LESS THAN THRESHOLD? OR EQUAL TO OR MORE THAN THRESHOLD?

AMOUNT OF GRIPPED TISSUE ⇒ NOT MORE THAN THRESHOLD (SHORT PITCH)

FIG.21

| AMOUNT OF GRIPPED TISSUE | OUTPUT ADJUSTMENT |
|---|---|
| NOT MORE THAN THRESHOLD (SHORT PITCH: AMOUNT OF GRIPPED TISSUE EASY TO CUT) | REDUCE OUTPUT FROM THAT IN NORMAL CONDITION |
| OTHER AMOUNTS OF GRIPPED TISSUE | NO CHANGE FROM THAT IN NORMAL CONDITION |

FIG.25

| TISSUE TENSION | OUTPUT ADJUSTMENT |
|---|---|
| NOT MORE THAN THRESHOLD (WEAK TENSION, DIFFICULT-TO-CUT CONDITION) | INCREASE OUTPUT FROM THAT IN NORMAL CONDITION |
| OTHER TISSUE TENSIONS | NO CHANGE FROM THAT IN NORMAL CONDITION |

FIG.28

| DISTANCE BETWEEN DEVICE AND ATTENTION OBJECT | OUTPUT ADJUSTMENT |
|---|---|
| NOT MORE THAN THRESHOLD (DISTANCE BETWEEN DEVICE AND ATTENTION OBJECT IS CLOSE) | REDUCE OUTPUT FROM THAT IN NORMAL CONDITION |
| OTHER DISTANCES | NO CHANGE FROM THAT IN NORMAL CONDITION |

FIG. 29
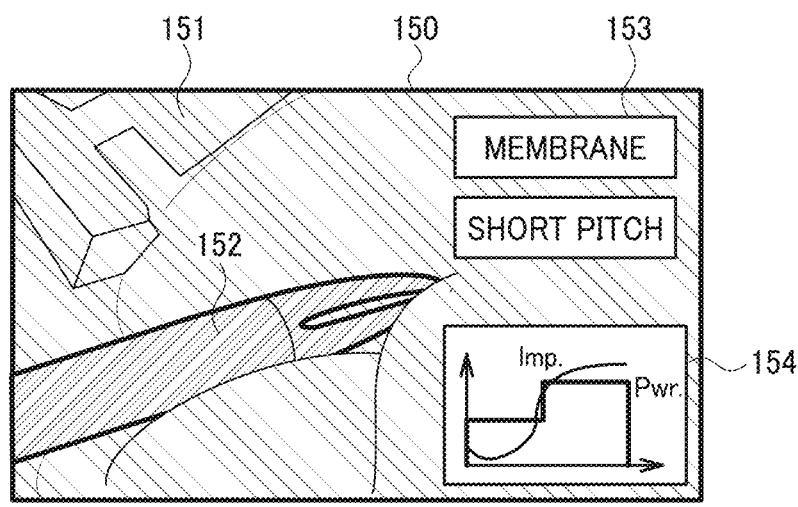
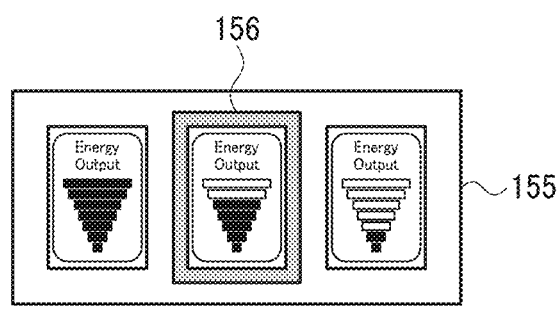

FIG.31

CONTROL ACCORDING TO TISSUE TYPE

| IMAGE INFORMATION | DEVICE INFORMATION | OUTPUT ADJUSTMENT | GOAL |
|---|---|---|---|
| THIN FILM | LOW IMPEDANCE | (1) REDUCE HF OUTPUT LEVEL<br>(2) REDUCE HF OUTPUT TIME<br>REDUCE LEVEL OF S&C MODE<br>(3) PERFORM US-ONLY OUTPUT | ★REDUCE THERMAL INVASION<br>(1)(2) DO NOT APPLY HF OUTPUT MORE THAN NECESSARY<br>(3) PERFORM ULTRASONIC-ONLY DIVISION |
| BLOOD VESSEL (THICK) | LOW IMPEDANCE | (1) INCREASE HF OUTPUT LEVEL<br>(2) EXTEND HF OUTPUT TIME<br>INCREASE LEVEL OF S&C MODE<br>(3) HF IS APPLIED INTERMITTENTLY IN (1)(2) | ★ENSURE SEALING<br>(1)(2) SEAL SUFFICIENTLY WITH HF<br>★ENSURE SEALING AND REDUCE THERMAL INVASION<br>(3) SUPPRESS TEMPERATURE RISE BY INTERMITTENCE |
| BLOOD VESSEL (THIN) | HIGH IMPEDANCE | (1) REDUCE HF OUTPUT LEVEL<br>(2) REDUCE HF OUTPUT TIME<br>REDUCE LEVEL OF S&C MODE | ★REDUCE THERMAL INVASION<br>(1)(2) DO NOT APPLY HF OUTPUT MORE THAN NECESSARY |
| MEMBRANE TISSUE CONTAINING BLOOD VESSEL AND LYMPHATIC VESSEL | | (1) INCREASE HF OUTPUT LEVEL<br>(2) EXTEND HF OUTPUT TIME<br>INCREASE LEVEL OF S&C MODE<br>(3) HF IS APPLIED INTERMITTENTLY IN (1)(2) | ★ENSURE SEALING<br>(1)(2) SEAL SUFFICIENTLY WITH HF<br>★ENSURE SEALING AND REDUCE THERMAL INVASION<br>(3) SUPPRESS TEMPERATURE RISE BY INTERMITTENCE |

FIG.32

CONTROL ACCORDING TO TISSUE CONDITION

| IMAGE INFORMATION | DEVICE INFORMATION | OUTPUT ADJUSTMENT | GOAL |
|---|---|---|---|
| MEMBRANE WITH LARGE AMOUNT OF FAT | HIGH IMPEDANCE | (1) INCREASE HF OUTPUT LEVEL<br>(2) EXTEND HF APPLICATION TIME BEFORE US OUTPUT<br>INCREASE LEVEL OF S&C MODE<br>(3) HF IS APPLIED INTERMITTENTLY IN (1)(2) | ★SUPPRESSION OF MIST<br>(1) INCREASE HF AND MELT FAT IN SHORT TIME<br>(2) EXTEND HF TIME TO SUFFICIENTLY MELT FAT<br>(3) MELTING WITHOUT EXCESSIVE TEMPERATURE RISE BY INTERMITTENCE |
| WET TISSUE (SUCH AS OOZING) | LOW IMPEDANCE | (1) INCREASE HF OUTPUT LEVEL<br>(2) EXTEND HF APPLICATION TIME BEFORE US OUTPUT | ★REDUCE THERMAL INVASION AND REDUCE TREATMENT TIME<br>(1) INCREASE HF AND DRY IN SHORT TIME<br>(2) EXTEND HF TIME TO SUFFICIENTLY DRY |
| VEIN WITH SMALL AMOUNT OF SURROUNDING TISSUE | LOW IMPEDANCE | (1) INCREASE HF OUTPUT LEVEL<br>(2) EXTEND HF OUTPUT TIME<br>INCREASE LEVEL OF S&C MODE<br>(3) HF IS APPLIED INTERMITTENTLY IN (1)(2) | ★ENSURE SEALING<br>(1)(2) SEAL SUFFICIENTLY WITH HF<br>★ENSURE SEALING AND REDUCE THERMAL INVASION<br>(3) SUPPRESS TEMPERATURE RISE BY INTERMITTENCE |

FIG.33

CONTROL ACCORDING TO AMOUNT OF GRIPPED TISSUE

| IMAGE INFORMATION | DEVICE INFORMATION | OUTPUT ADJUSTMENT | GOAL |
|---|---|---|---|
| SHORT PITCH | HIGH IMPEDANCE | (1) REDUCE HF OUTPUT LEVEL<br>(2) REDUCE HF OUTPUT TIME<br>REDUCE LEVEL OF S&C MODE<br>(3) PERFORM US-ONLY OUTPUT | ★REDUCE THERMAL INVASION<br>(1)(2) DO NOT APPLY HF OUTPUT MORE THAN NECESSARY<br>(3) PERFORM ULTRASONIC-ONLY DIVISION |

FIG.34

CONTROL ACCORDING TO TISSUE TENSION

| IMAGE INFORMATION | DEVICE INFORMATION | OUTPUT ADJUSTMENT | GOAL |
|---|---|---|---|
| TENSION IS WEAK | HIGH IMPEDANCE | (1) INCREASE HF OUTPUT LEVEL<br>(2) EXTEND HF OUTPUT TIME<br>INCREASE LEVEL OF S&C MODE<br>(3) INCREASE US OUTPUT<br>(4) HF IS APPLIED INTERMITTENTLY | ★REDUCE INCISION TIME<br>(1)(2) SEAL SUFFICIENTLY WITH HF<br>★REDUCE TIME<br>(3) INSTANTLY SEPARATE WITH STRONG US<br>★REDUCE THERMAL INVASION BY TAKING TIME<br>(4) SUPPRESS TEMPERATURE RISE BY INTERMITTENCE |

FIG.35

CONTROL ACCORDING TO SURROUNDING AREA INFORMATION

| IMAGE INFORMATION | OUTPUT ADJUSTMENT | GOAL |
|---|---|---|
| THERE ARE CRITICAL ORGANS/CLIPS IN SURROUNDING AREA (E.G., WITHIN 2 MM) | (1) REDUCE HF OUTPUT LEVEL<br>(2) REDUCE HF OUTPUT TIME<br>REDUCE LEVEL OF S&C MODE<br>(3) PERFORM US-ONLY OUTPUT | ★REDUCE THERMAL INVASION<br>(1)(2) DO NOT APPLY HF OUTPUT MORE THAN NECESSARY<br>(3) PERFORM ULTRASONIC-ONLY DIVISION |
| IN BLOOD VESSEL, THERE ARE CLIPS AT BOTH ENDS OF PORTION TO BE SEPARATED | (1) REDUCE HF OUTPUT LEVEL<br>(2) REDUCE HF OUTPUT TIME<br>REDUCE LEVEL OF S&C MODE<br>(3) PERFORM US-ONLY OUTPUT | ★REDUCE THERMAL INVASION<br>(1)(2) DO NOT APPLY HF OUTPUT MORE THAN NECESSARY<br>(3) PERFORM ULTRASONIC-ONLY DIVISION |

SYSTEM FOR ESTIMATING IMAGE RECOGNITION INFORMATION FROM AT LEAST IMAGES OF ENERGY DEVICE AND BIOLOGICAL TISSUE, COMPUTER-READABLE NON-TRANSITORY INFORMATION STORAGE MEDIUM, AND ENERGY OUTPUT ADJUSTMENT METHOD

CROSS REFERENCE TO RELATED APPLICATIONS

This application is a continuation of International Patent Application No. PCT/JP2022/009691, having an international filing date of Mar. 7, 2022, which designated the United States, the entirety of which is incorporated herein by reference. U.S. Provisional Patent Application No. 63/221,128 filed on Jul. 13, 2021 and U.S. Provisional Patent Application No. 63/222,252 filed on Jul. 15, 2021 are also incorporated herein by reference in its entirety.

BACKGROUND OF THE INVENTION

U.S. Patent Application Publication No. 2017/0252095 discloses a surgery system that determines the type of the tissue being gripped by an energy device based on energy output data of the energy device, position of the tissue, and patient condition or optical tissue sensor information. For example, whether or not it is a vascular or non-vascular tissue, or the presence or absence of nerves therein, and the like, are recognized as the type of the tissue. This surgery system stops energy output and warns the user when the treatment is inappropriate for the recognized tissue type.

SUMMARY OF THE INVENTION

In accordance with one of some aspect, there is provided a system comprising:
a memory storing a trained model trained so as to output image recognition information from a training device tissue image or a training tissue image, the image recognition information being at least one of tissue information about at least one biological tissue or treatment information about treatment on the at least one biological tissue, the training device tissue image being an image of at least one energy device for performing energy output by receiving energy supply and the at least one biological tissue, the training tissue image being an image of the at least one biological tissue; and
a processor,
the processor being configured to perform:
acquiring a captured image that is an image of the at least one energy device and the at least one biological tissue;
executing processing based on the trained model stored in the memory to estimate the image recognition information from the captured image; and
outputting an energy output adjustment instruction based on the estimated image recognition information to a generator that controls an energy supply amount to the energy device based on the energy output adjustment instruction,
the trained model comprising:
a first trained model trained to detect a bounding box indicating a distal end section of the at least one energy device from the training device tissue image; and
a second trained model trained to output the image recognition information from the training device tissue image in the bounding box,
the processor, in the estimating, detecting the bounding box from the captured image by processing based on the first trained model and estimating the image recognition information from the captured image in the bounding box by processing based on the second trained model.

In accordance with one of some aspect, there is provided a computer-readable non-transitory information storage medium storing a program for causing a computer to execute:
acquiring a captured image, which is an image of at least one energy device that receives energy supply and performs energy output and at least one biological tissue;
estimating image recognition information from the captured image by processing based on a trained model trained to output the image recognition information from a training device tissue image or a training tissue image, the image recognition information being at least one of tissue information about the at least one biological tissue or treatment information about treatment on the at least one biological tissue, the training device tissue image being an image of the at least one energy device and the at least one biological tissue, the training tissue image being an image of the at least one biological tissue;
outputting an energy output adjustment instruction based on the estimated image recognition information to a generator that controls an energy supply amount to the energy device based on the energy output adjustment instruction; and
in the estimating, detecting a bounding box from the captured image by processing based on a first trained model included in the trained model and estimating the image recognition information from the captured image in the bounding box by processing based on a second trained model included in the trained model, the first trained model being a model trained to detect the bounding box indicating a distal end section of the at least one energy device from the training device tissue image, the second trained model being a model trained to output the image recognition information from the training device tissue image in the bounding box.

In accordance with one of some aspect, there is provided an energy output adjustment method, comprising:
acquiring a captured image, which is an image of at least one energy device that receives energy supply and performs energy output and at least one biological tissue; and
estimating image recognition information from the captured image by processing based on a trained model trained to output the image recognition information from a training device tissue image or a training tissue image, the image recognition information being at least one of tissue information about the at least one biological tissue or treatment information about treatment on the at least one biological tissue, the training device tissue image being an image of the at least one energy device and the at least one biological tissue, the training tissue image being an image of the at least one biological tissue;
outputting an energy output adjustment instruction based on the estimated image recognition information to a generator that controls an energy supply amount to the energy device based on the energy output adjustment instruction; and in the estimating, detecting a bounding box from the captured image by processing based on a first trained model included in the trained model and estimating the image recognition information from the captured image in the bounding box by processing based on a second trained model included in the trained model, the first trained model being a model trained to detect the bounding box indicating a distal end section of the at least one energy device from the training device tissue image, the second trained model being a model trained to output the image recognition information from the training device tissue image in the bounding box.

BRIEF DESCRIPTION OF THE DRAWINGS

FIG. 9 is an example of a first recognition process when a control section recognizes a tissue type.
FIG. 11 is an example of adjustment of output when a control section recognizes a tissue type.
FIG. 15 is an example of a first recognition process when a control section recognizes a tissue condition.
FIG. 17 is an example of adjustment of output when a control section recognizes a tissue condition.
FIG. 18 is an example of processing when a control section recognizes an amount of gripped tissue.
FIG. 19 is an example of a first recognition process when a control section recognizes an amount of gripped tissue.
FIG. 20 is an example of a second recognition process when a control section recognizes an amount of gripped tissue.
FIG. 21 is an example of adjustment of output when a control section recognizes an amount of gripped tissue.
FIG. 25 is an example of adjustment of output when a control section recognizes a tissue tension.

FIG. 28 is an example of adjustment of output when a control section recognizes the distance between the distal end section of a treatment tool and an attention object.
FIG. 29 is an example of displaying information regarding energy output adjustment.
FIG. 31 is an example of adjustment of output in the case of using a combination device.
FIG. 32 is an example of adjustment of output in the case of using a combination device.
FIG. 33 is an example of adjustment of output in the case of using a combination device.
FIG. 34 is an example of adjustment of output in the case of using a combination device.
FIG. 35 is an example of adjustment of output in the case of using a combination device.

DETAILED DESCRIPTION

Figure 1:
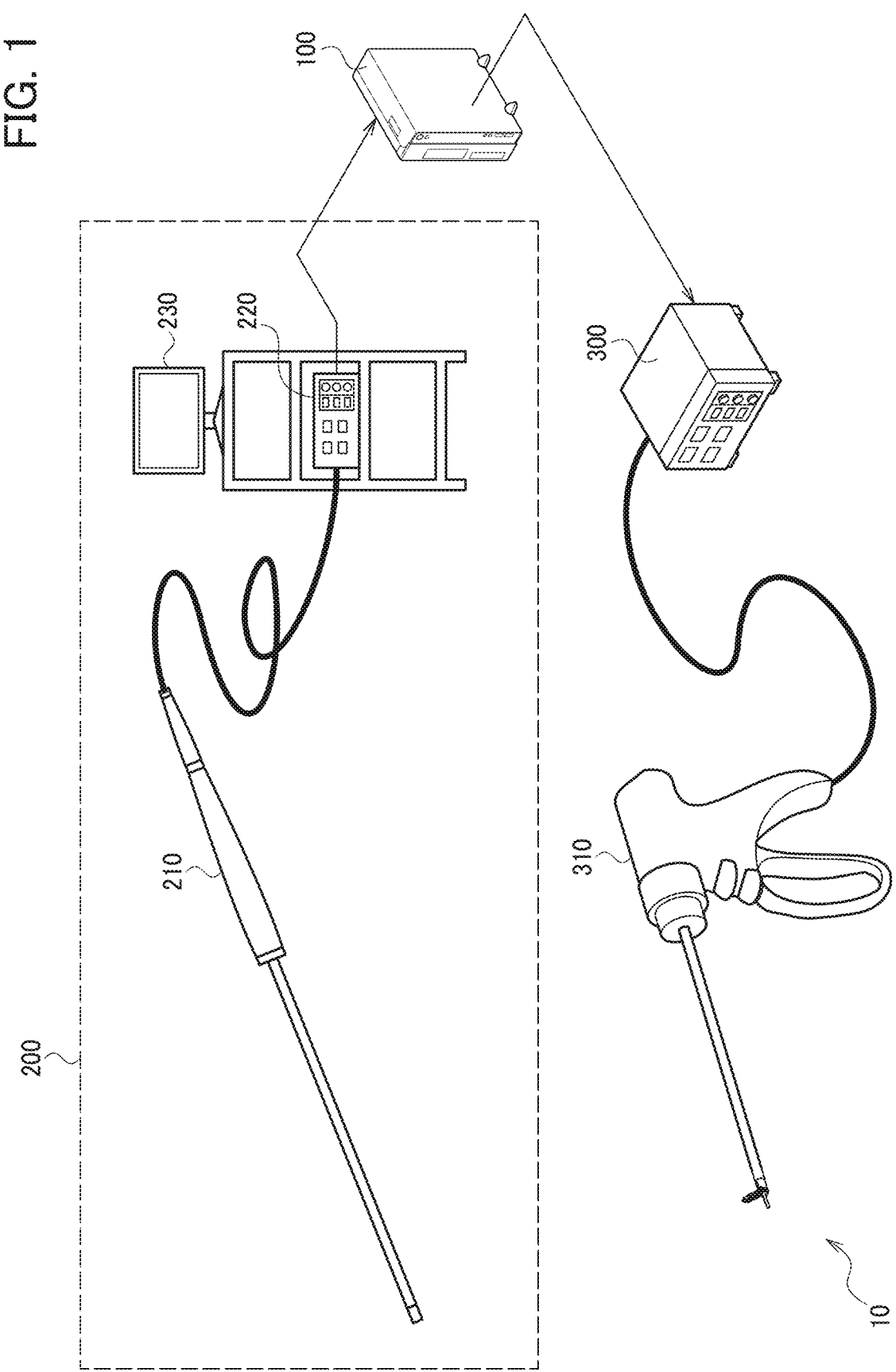
FIG. 1 is a configuration example of a system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

1. System

FIG. 1 is a configuration example of a system 10 according to the present embodiment. FIG. 1 shows a configuration example of the system for capturing images of the surgical field using an endoscope. The system 10 shown in FIG. 1 includes a controller 100, an endoscope system 200, a generator 300, and an energy device 310. The system 10 is a surgery system for performing surgery using at least one energy device under an endoscope. Although an example in which the system 10 includes a single energy device 310 is shown, the system 10 may include a plurality of energy devices.

The endoscope system 200 is a system that performs imaging by an endoscope, image processing of the endoscope images, and display of the endoscope images in a monitor. The endoscope system 200 includes an endoscope 210, a main body device 220, and a display 230. Herein, a rigid mirror for surgical operation is described as an example.

The endoscope 210 includes an insertion section to be inserted into a body cavity, an operation section to be connected to the base end of the insertion section, a universal cord connected to the base end of the operation section, and a connector section to be connected to the base end of the universal cord. The insertion section includes a rigid tube, an objective optical system, an imaging sensor, an illumination optical system, a transmission cable, and a light guide. The objective optical system and the imaging sensor for capturing images inside the body cavity and the illumination optical system for illuminating the inside of the body cavity are installed in the distal end section of the rigid tube having an elongated cylindrical shape. The distal end section of the rigid tube may be configured to be bendable. The transmission cable that transmits image signals acquired by the image sensor, and the light guide that guides the illumination light to the illumination optical system are provided inside the rigid tube. The operation section is held by the [user and accepts operations from the user. The operation section has buttons to which various functions are assigned. When the distal end of the insertion section is bendable, an angle operation lever is provided in the operation section. The connector section includes a video connector that detachably connects the transmission cable to the main body device 220, and a light guide connector that detachably connects the light guide to the main body device 220.

The main body device 220 includes a processing device that controls the endoscope, performs image processing of endoscope images, and displays the endoscope images, and a light source device that generates and controls illumination light. The main body device 220 is also called a video system center. The processing device is constituted of a processor such as a CPU, and performs image processing of the image signals transmitted from the endoscope 210 to generate endoscope images and then outputs the endoscope images to the display 230 and the controller 100. The illumination light emitted from the light source device is guided by the light guide to the illumination optical system and is emitted from the illumination optical system into the body cavity.

The energy device 310 is a device that outputs energy by high-frequency power, ultrasonic wave, or the like from its distal end section to perform treatments including coagulation, sealing, hemostasis, incision, division, dissection, or the like, with respect to tissues in contact with its distal end section. The energy device 310 is also referred to as an energy treatment tool. The energy device 310 may be a monopolar device in which high-frequency power is energized between an electrode at the distal end of the device and an electrode outside the body, a bipolar device in which high-frequency power is energized between two jaws, an ultrasonic device, which has a probe and a jaw and emits ultrasonic waves from the probe, a combination device in which high-frequency power is energized between the probe and the jaw and also emits ultrasonic waves from the probe, or the like.

The generator 300 supplies energy to the energy device 310, controls the energy supply, and acquires electrical information from the energy device 310. When the energy device 310 outputs high-frequency energy, the generator 300 provides a high-frequency power, and the energy device 310 outputs the high-frequency power from an electrode or jaw. When the energy device 310 outputs ultrasonic energy, the generator 300 provides an electric power, and the probe of the energy device 310 converts the electric power into ultrasonic wave and outputs it.

The electrical information refers to electrical information of the tissue that comes in contact with the electrode or jaw of the energy device 310; more specifically, the electrical information is information obtained as a response to the output of the high-frequency power to the tissue by the energy device 310. The electrical information is, for example, impedance information of the tissue to be treated by the energy device 310. However, as described later, the electrical information is not limited to impedance information.

The generator 300 performs control of time-based change in the energy output from the energy device 310 according to the output sequence. The generator 300 may vary the energy output according to the time-based change in the impedance information. In this case, the output sequence may specify how the energy output is changed in response to the change in the impedance information. The generator 300 may also automatically turn off the energy output according to the time-based change in the impedance information. For example, the generator 300 may determine that the treatment is completed when the impedance rises to a certain level or higher, and may turn off the energy output.

The controller 100 recognizes tissue information, treatment information, or both of them from the endoscope image through an image recognition process using machine learning or other methods, and outputs an energy output adjustment instruction to the generator based on the recognized information. The tissue information, the treatment information, or both of them recognized from endoscope images are also referred to as image recognition information. Specifically, these information items relate to matters that affect the degree of heat diffusion in the treatment by the energy device 310.

More specifically, the tissue information is information about the tissue to be treated by the energy device 310, and includes, for example, the tissue type or tissue condition. The treatment information is information about the treatment performed on the tissue; more specifically, treatment information is the effect of the device used for the treatment on the tissue, the results of the effect, the positional relationship between the device and the tissue, or the like. The device referred herein may be the energy device 310 or any other devices. The treatment information includes, for example, the amount of the gripped tissue, the amount of the tissue traction, the tissue tension, the distance between the distal end section of the energy device 310 and the surrounding tissue, and the like.

The generator 300 adjusts the energy output of the energy device 310 according to the energy output adjustment instruction. Specifically, the system 10 of the present embodiment is a system that automatically adjusts the energy output from the energy device 310 based on endoscope images. The generator 300 supplies energy to the energy device 310 in the energy supply amount directed by the energy output adjustment instruction. As the energy device 310 receives the energy supply and performs energy output accordingly, the energy output is adjusted according to the energy output adjustment instruction.

The energy output adjustment instruction includes an instruction to increase or decrease the output as the overall waveform of the output sequence, an instruction to set an output sequence from among a plurality of selectable output sequences, and the like. For example, when the energy output from the energy device 310 is adjustable by a staged magnification factor, the energy output adjustment instruction is an instruction indicating the staged magnification factor for the energy output. The generator 300 increases or decreases the high-frequency output or ultrasound output according to the magnification factor according to the instruction. If the energy output adjustment instruction is given before the start of the output sequence, the entire waveform of the output sequence is multiplied by the magnification factor, thereby increasing or decreasing the output as a whole output sequence. The magnification factor may be continuously adjustable. In another case where a plurality of output sequences are provided, the energy output adjustment instruction is an instruction to specify one of these plural output sequences. The generator 300 performs energy output from the energy device 310 according to the output sequence thus instructed. The energy output adjustment instruction may include both of the instruction to increase or decrease the energy output, and an instruction to change the output sequence.

In relation to these procedures, one of the keys to usual energy treatment in surgery is to suppress heat diffusion from the energy device so as to avoid thermal damages to surrounding organs. However, because the tissues to be treated are not uniform, the time required for the procedure, such as division, varies due to the difference in tissue type, the difference in tissue condition, individual differences of the patients, or the like; accordingly, the degree of heat diffusion also varies. To cope with these issues and suppress heat diffusion, the doctors have been adjusting the amount of the gripped tissue and the tissue tension; however, such an operation requiring experience and appropriate adjustment may be difficult in some cases, in particular for non-experts.

Thus, in the treatments using energy devices, heat diffusion to the surrounding area is often problematic, and therefore the doctors perform the treatments while estimating the degree of diffusion. In the technique of the U.S. Patent Application Publication No. 2017/0252095 described above, the tissue type, such as whether or not it is a vascular or non-vascular tissue, is recognized based on, for example, energy output data from the energy device. However, the degree of heat diffusion does not solely depend on either it is a vascular tissue or a non-vascular tissue, but is also influenced by, for example, the tissue condition, such as the thickness of the tissue or its immersion in blood, as well as the operation by the doctor, such as the tissue gripping amount or traction strength by the device. Specifically, heat diffusion occurs when the heat in the tissue, which is generated in response to the application of energy by the energy device, diffuses through the interior or surface of the surrounding tissue. Alternatively, heat diffusion also occurs when the energy output by the energy device also diffuses into the surrounding tissue of the gripped tissue and heat is generated in the surrounding tissue where the energy is diffused. The degree of this heat diffusion differs depending on the tissue type, the tissue condition, the amount of gripped tissue, the tissue tension, or the like.

In this regard, in some embodiments, the system 10 applies energy suitable for the tissue based on the image recognition information, such as the tissue type, the tissue condition, the amount of gripped tissue, the tissue tension, or the like. As a result, it is possible to reduce heat diffusion from the object to be treated by the energy device to the surrounding tissue. In addition, since the system 10 performs adjustment of energy output instead of the adjustments of the gripping amount and the tension that have previously been performed by the doctors, it is possible to reduce the burden on the doctors. Furthermore, since the system 10 autonomously performs adjustment of the output, it is possible to enable even inexperienced doctors to perform stable treatments. With the procedures described above, it is possible to improve the stability of the surgery or equalize the manipulation regardless of the experiences of the doctors.

2. Controller

Figure 2:
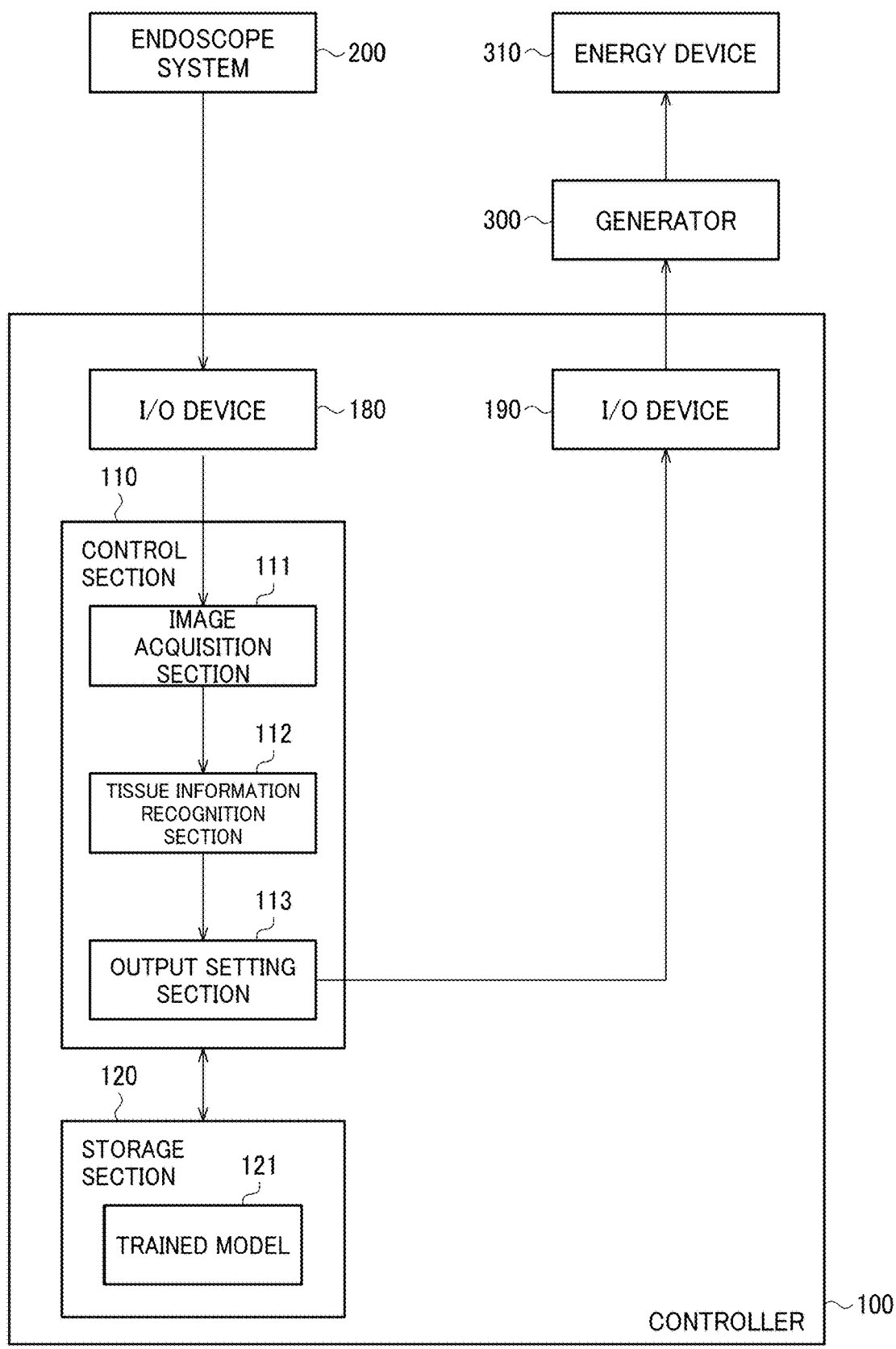
FIG. 2 is a configuration example of a controller.

FIG. 2 is a configuration example of the controller 100. The controller 100 includes a control section 110, a storage section 120, an I/O device 180, and an I/O device 190. FIGS. 1 and 2 show an example in which the controller 100 is constituted of a device separated from the generator 300. In this case, the controller 100 is constituted of an information processing device, such as a PC, a server device, or the like. Alternatively, the controller 100 may be implemented by a cloud system that performs the processes with one or a plurality of information processing devices connected via a network.

The I/O device 180 receives image data of endoscope image from the main body device 220 of the endoscope system 200. The I/O device 180 is a connector to which an image transmission cable is connected, or an interface circuit connected to the connector to perform communication with the main body device 220.

The control section 110 recognizes at least one of the tissue information and the treatment information from an endoscope image through an image recognition process using a trained model 121, and outputs an energy output adjustment instruction based on the image recognition information. The control section 110 includes one or a plurality of processors serving as hardware. The processor is a general-purpose processor such as a CPU (Central Processing Unit), GPU (Graphical Processing Unit), DSP (Digital Signal Processor), or the like. Alternatively, the processor may be a dedicated processor such as an ASIC (Application Specific Integrated Circuit), an FPGA (Field Programmable Gate Array), or the like.

The storage section 120 stores the trained model 121 used for the image recognition process. For example, when the image recognition process is performed by a general-purpose processor, the storage section 120 stores, as the trained model 121, a program that describes an inference algorithm and parameters used for the inference algorithm. When the image recognition process is performed by a dedicated processor with a hardware inference algorithm, the storage section 120 stores the parameters used for the inference algorithm as a trained model 121. The storage section 120 is a storage device, such as a semiconductor memory, a hard disk drive, an optical disc drive, or the like. The semiconductor memory is, for example, a RAM, a ROM, a non-volatile memory or the like.

For example, a neural network may be used as the inference algorithm of the image recognition process. The weight coefficients and the bias of the inter-node connections in the neural network correspond to the parameters. The neural network includes an input layer to which image data is entered, an intermediate layer for performing a calculation process with respect to the data input via the input layer, and an output layer for outputting recognition results based on the calculation result output from the intermediate layer. For example, a CNN (Convolutional Neural Network) may be used as the neural network to be used for the image recognition process.

The control section 110 also includes an image acquisition section 111, a tissue information recognition section 112, and an output setting section 113. The storage section 120 stores programs describing the functions of the image acquisition section 111, the tissue information recognition section 112, and the output setting section 113. One or more processors in the control section read out a program from the storage section 120 and executes the program, thereby implementing the functions of the image acquisition section 111, the tissue information recognition section 112, and the output setting section 113. The program describing the functions of each of these sections may be stored in a non-transitory information storage medium, which is a computer-readable medium. The information storage medium can be implemented by, for example, an optical disc, a memory card, an HDD, a semiconductor memory, or the like. The semiconductor memory is, for example, a ROM or a nonvolatile memory.

The I/O device 190 transmits a signal of energy output adjustment instruction to the generator 300. The I/O device 190 is a connector to which a signal transmission cable is connected, or an interface circuit connected to the connector to perform communication with the generator 300.

Figure 3:
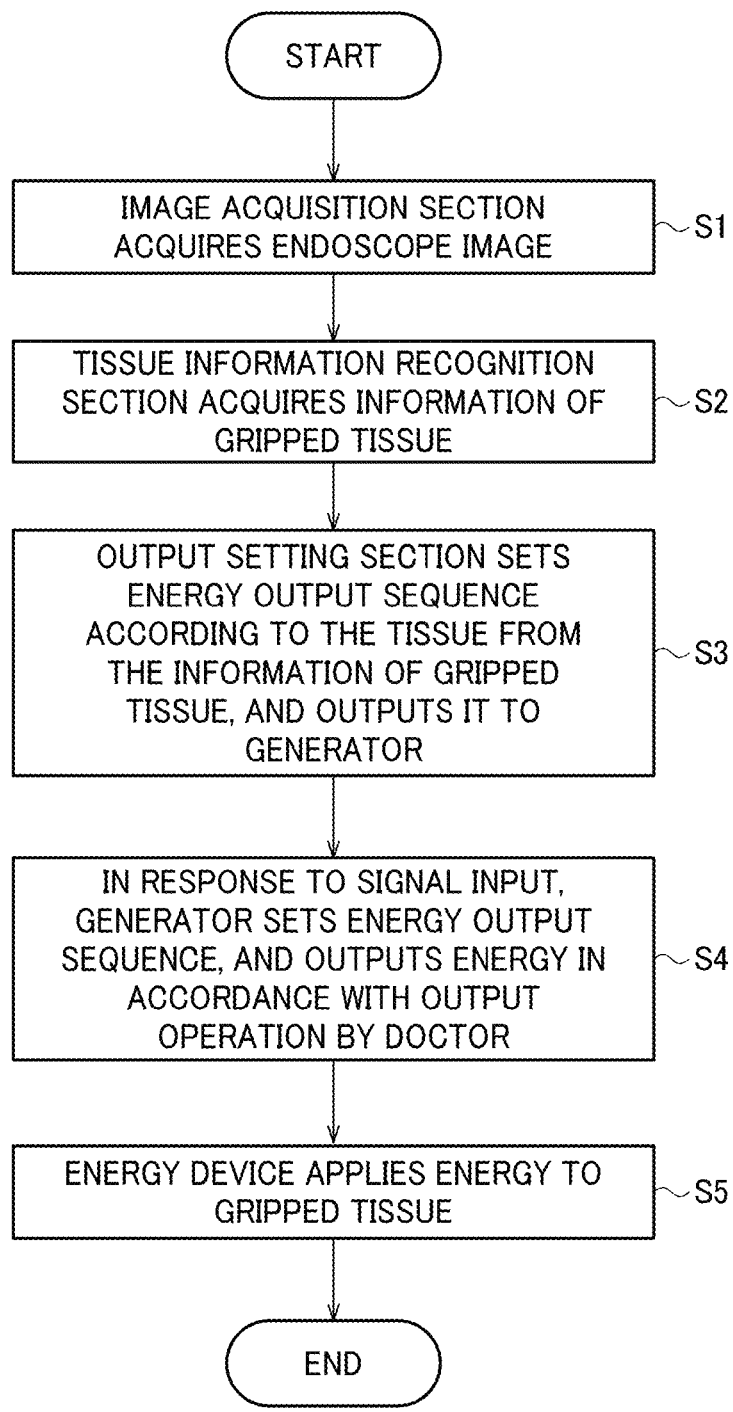
FIG. 3 is a flowchart for explaining processing performed by a controller and a system.

FIG. 3 is a flowchart for explaining processing performed by the controller 100 and the system 10.

In the step S1, the image acquisition section 111 acquires an endoscope image from the main body device 220 of the endoscope system 200 via the I/O device 180. In the step S2, the tissue information recognition section 112 performs the image recognition process using the trained model 121 with respect to the endoscope image, thereby acquiring at least one of the tissue information and the treatment information as the image recognition information. In the step S3, the output setting section 113 outputs the energy output adjustment instruction according to the image recognition information to the generator 300 via the I/O device 190.

In the step S4, the generator 300 sets the energy output sequence in response to the energy output adjustment instruction, and performs energy output according to the output operation performed by the doctor. For example, the doctor operates the output start button provided on the operation section of the energy device 310, and the generator 300 starts supplying energy to the energy device 310 in response to the operational input. In the step S5, the energy device 310 applies energy to the tissue being gripped in response to the energy supply from the generator 300.

In the above case, the controller 100 and the generator 300 are constituted as separate devices and the entire control section 110 is included in the device constituting the controller 100; however, the hardware configuration of the controller 100 and the generator 300 is not limited to this configuration. For example, the controller 100 and the generator 300 may be constituted of a single device. Alternatively, the system 10 may include a first device and a second device, and the first device may include the image acquisition section 111 and the tissue information recognition section 112 of the control section 110, and the second device may include the output setting section 113 and the generator 300 of the control section 110. In this case, the first device outputs the image recognition information, which is at least one of the tissue information and the treatment information, to the second device, and the second device controls the energy output of the generator according to the image recognition information.

3. Energy Device

In the following, a monopolar device 320, a bipolar device 330, an ultrasonic device 340, and a combination device are described as examples of the energy device 310.

Figure 4:
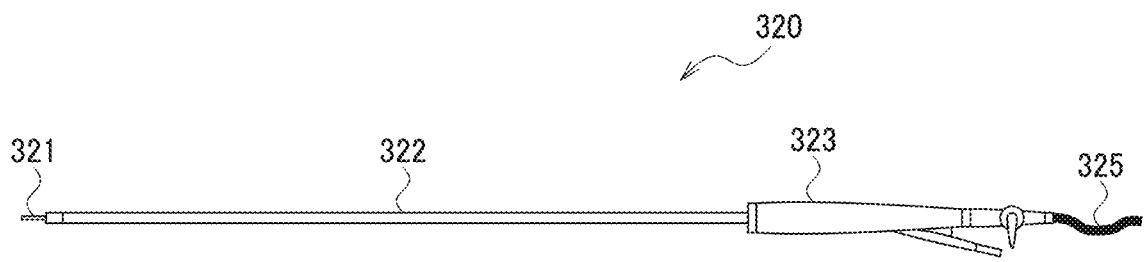
FIG. 4 is a configuration example of a monopolar device.

FIG. 4 is a configuration example of the monopolar device 320. The monopolar device 320 includes an insertion section 322 having an elongated cylindrical shape, an electrode 321 provided at the distal end of the insertion section 322, an operation section 323 connected to the base end of the insertion section 322, and a cable 325 connecting the operation section 323 and a connector (not shown). The connector is detachably connected to the generator 300.

The high-frequency power output by the generator 300 is transmitted by the cable 325 and output from the electrode 321. A counter electrode plate is provided outside the patient's body, and energization occurs between the electrode 321 and the counter electrode plate. This applies high-frequency energy to the tissue in contact with the electrode 321, and Joule heat is generated in the tissue. Electrodes having various shapes are used for the electrode 321 depending on the type of the treatment. The monopolar device 320 is capable of adjusting the degree of coagulation and incision by changing the energization pattern. The object to be treated by the monopolar device 320 is the tissue in contact with the electrode 321, and the heat diffused around this tissue in contact with the electrode 321 may affect the surrounding tissue.

Figure 5:
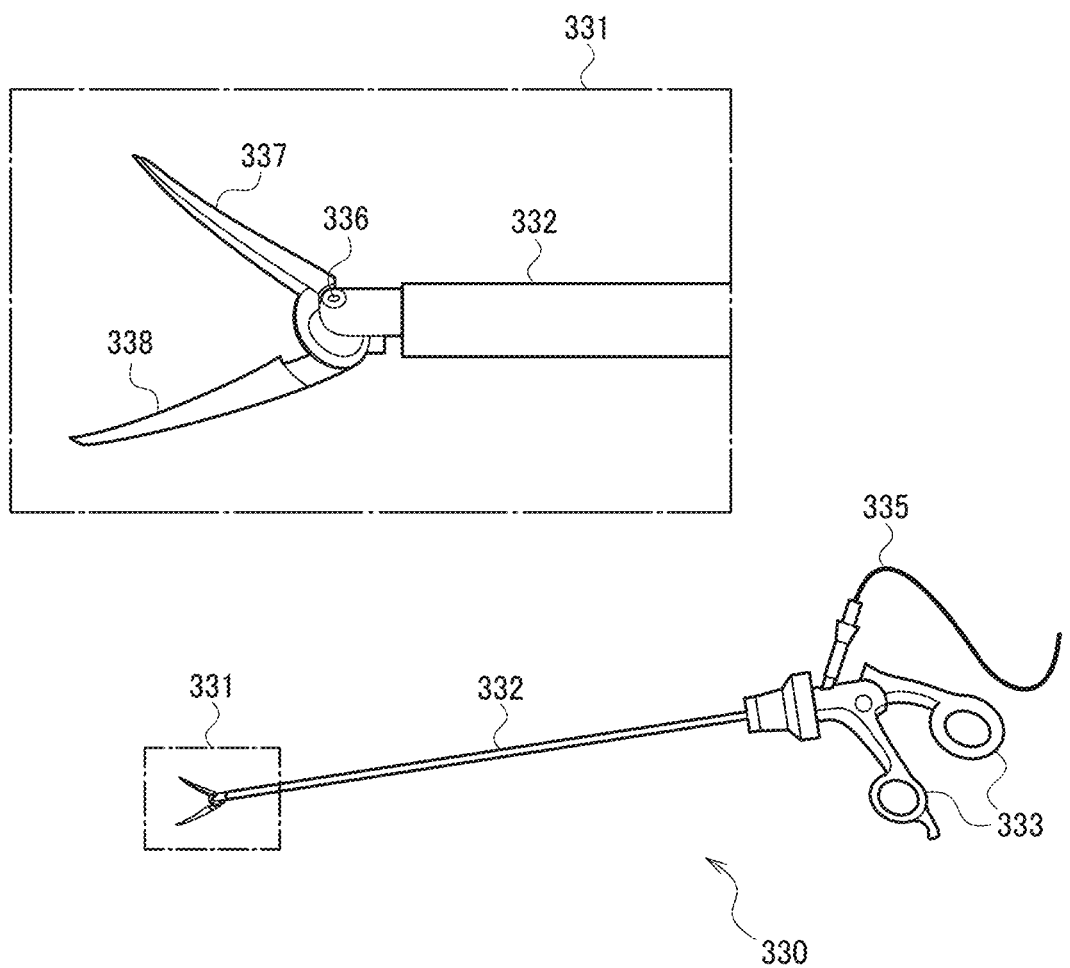
FIG. 5 is a configuration example of a bipolar device.

FIG. 5 is a configuration example of the bipolar device 330. The bipolar device 330 includes an insertion section 332 having an elongated cylindrical shape, two jaws 337 and 338 provided at the distal end section 331 of the insertion section 332, an operation section 333 connected to the base end of the insertion section 332, and a cable 335 connecting the operation section 333 and a connector (not shown). The connector is detachably connected to the generator 300. The jaws 337 and 338 are movable portions for gripping a tissue and also applying energy to the gripped tissue. The jaws 337 and 338 are structured to be openable/closable around an axis provided at the base end 336. The operation section 333 has a grip section for operating the opening and closing of the jaws 337 and 338. When the doctor tightly holds the grip section, the jaws 337 and 338 are closed to grip the tissue.

The high-frequency power output by the generator 300 is transmitted by the cable 335, and, when the two jaws 337 and 338 grip a tissue, energization occurs between the two jaws 337 and 338. As a result, high-frequency energy is applied to the tissue sandwiched between the two jaws 337 and 338, Joule heat is generated in the tissue, and the tissue is coagulated. The generator 300 may measure the impedance information of the tissue gripped by the jaws 337 and 338, detect completion of the treatment based on the impedance information, and may automatically stop the energy output. Further, the generator 300 may also automatically adjust the energy applied to the tissue based on the impedance information. With regard to the heat diffusion of the bipolar device, for example, although the device temperature of the bipolar device 330 rises only to about 100 degrees Celsius, there is a possibility that a sneak current is generated around the area gripped by the jaws 337 and 338, and heat diffusion may be generated by the sneak current.

A vessel sealing device is a derivative device of a bipolar device. A vessel sealing device is a bipolar device provided with a cutter on its jaw, and separate the tissue by running the cutter after coagulating the tissue by energization.

Figure 6:
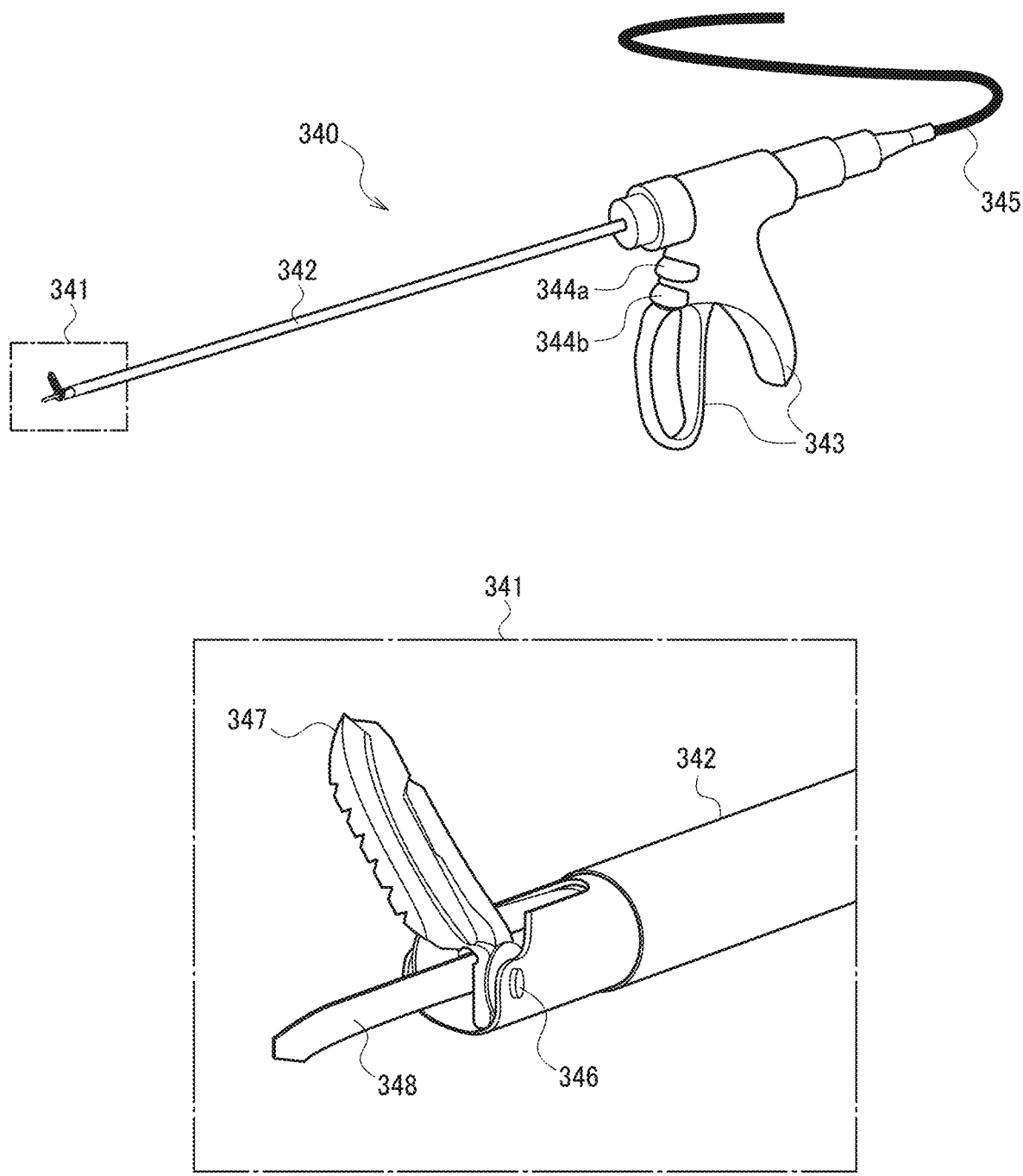
FIG. 6 is a configuration example of an ultrasonic device.

FIG. 6 is a configuration example of the ultrasonic device 340. The ultrasonic device 340 includes an insertion section 342 having an elongated cylindrical shape, a jaw 347 and a probe 348 provided at the distal end section 341 of the insertion section 342, an operation section 343 connected to the base end of the insertion section 342, and a cable 345 connecting the operation section 343 and a connector (not shown). The connector is detachably connected to the generator 300. The jaw 347 is movable around an axis provided at the base end 346, and is structured to be openable/closable with respect to the non-movable probe 348. The operation section 343 has a grip section for operating the opening and closing of the jaw 347. When the doctor tightly holds the grip section, the jaw 347 is closed, and the jaw 347 and the probe 348 grip the tissue. The operation section 343 is provided with an operation button 344*a* to which a first output mode is assigned, and an operation button 344*b* to which a second output mode is assigned. The output mode is selected according to what treatment is to be performed. When the operation button for each output mode is pressed, ultrasonic energy is output in the output sequence for the corresponding mode.

The power output by the generator 300 is transmitted by the cable 335, and when the operation button 344*a* or the operation button 344b is pressed, the probe 348 converts the power into ultrasonic wave and outputs it. As a result, a frictional heat is generated in the tissue sandwiched between the jaw 347 and the probe 348, and the tissue is coagulated or incised. With regard to the heat diffusion of the high-frequency device, for example, although the heat diffusion of the ultrasonic device 340 is smaller than that of the high-frequency device, the device temperature of the ultrasonic device 340 can rise to nearly 200 degrees Celsius. The heat diffusion of the ultrasonic device 340 is characterized by its tendency to occur in the direction of the distal end of the probe 348.

The combination device that uses both high-frequency power and ultrasonic wave has a configuration similar to that of the ultrasonic device shown in FIG. 6, for example. However, the combination device is capable of energizing high-frequency power between the jaw and the probe to generate Joule heat in the tissue gripped by the jaw and the probe, thus coagulating the tissue. Similarly to the ultrasonic device, the combination device is also capable of incising a tissue gripped by the jaw and the probe by outputting ultrasonic waves from the probe. A high-frequency mode is assigned to one of the two operation buttons provided on the operation section, and a seal-and-cut mode is assigned to the other one of the two operation buttons. The high-frequency mode is a mode in which coagulation and other treatments are performed using only high-frequency energy output. The seal-and-cut mode is a mode in which high-frequency energy and ultrasonic energy are used in combination, and the tissue is coagulated and separated by high-frequency energy output. With regard to the heat diffusion of the combination device, for example, heat diffusion similar to either or both of those of the bipolar device and the ultrasonic device may occur.

In the following embodiment, an exemplary case where the bipolar device 330 is mainly used as the energy device 310 is described. However, it should be noted that the present embodiment is applicable to any cases of using various energy devices mentioned above that may cause heat diffusion.

4. Example of Processing When Recognizing Tissue Type

Figure 7:
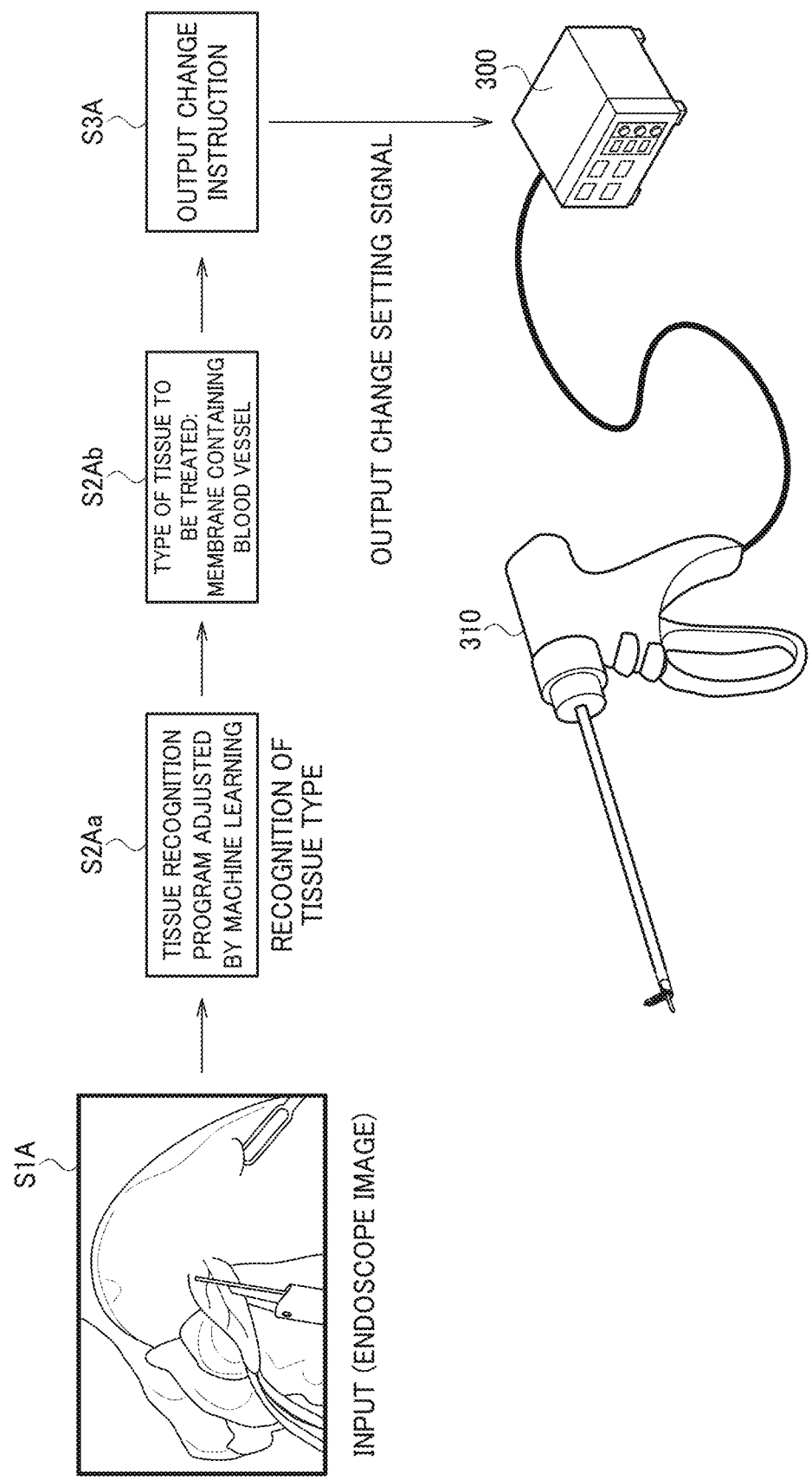
FIG. 7 is an example of processing when a control section recognizes a tissue type.

FIG. 7 is an example of processing when the control section 110 recognizes the tissue type. As shown in S1A, an endoscope image is input to the control section 110. Specifically, each frame image of the moving image captured by the endoscope is sequentially input to the control section 110. In the endoscope image input to the control section 110, one or a plurality of tissues and one or a plurality of energy devices are captured.

As shown in S2Aa, the control section 110 recognizes the tissue type from the endoscope image by executing a tissue recognition program adjusted by machine learning. Specifically, the control section 110 recognizes the type of the tissue gripped by the jaws of the bipolar device or the type of the tissue surrounding the gripped tissue. A tissue type refers to the type of the tissue present inside or outside the organ, or the type of the organ itself. Examples of the tissue present inside or outside the organ include arteries, veins, blood vessel-containing membrane, hepatogastric ligament, mesentery, thin films, nerves, fat, and the like. The organ is, for example, esophagus, stomach, pancreas, liver, small intestine, or the like. As shown in S2Ab, the control section 110 outputs the tissue type recognized from the endoscope image. FIG. 7 shows an example of recognizing a blood vessel-containing membrane.

As shown in S3A, the control section 110 gives an output change instruction according to the tissue type recognized from the endoscope image. Specifically, the storage section 120 stores table data in which energy output adjustment instruction is associated with each tissue type, and the control section 110 outputs an energy output adjustment instruction corresponding to the tissue type by referring to the table data. The generator 300 adjusts the output sequence of the bipolar device according to the energy output adjustment instruction output by the control section 110. The algorithm for outputting energy output adjustment instruction according to the tissue type is not limited to the above.

An energy output adjustment instruction is an instruction to increase, decrease, or maintain the energy output based on a reference energy output. The generator 300 has an operation section for accepting an energy output setting operation, and the energy output can be set by the operation section to one of, for example, five intensity levels (1 to 5). The intensity 1 represents the lowest energy output and the intensity 5 represents the highest energy output. The reference energy output is, for example, a predetermined energy output such as "intensity 3". In this case, the instruction to increase the energy output to be greater than the reference energy output is an instruction to set the intensity to "intensity 4" or "intensity 5," and the instruction to decrease the energy output to be lower than the reference energy output is an instruction to set the intensity to "intensity 2" or "intensity 1." Alternatively, the reference energy output may be the energy output currently set by the operation section of the generator 300. In this case, the instruction to increase the energy output to be greater than the reference energy output is an instruction to set the energy output to be higher than the currently set energy output, and the instruction to decrease the energy output to be lower than the reference energy output is an instruction to set the energy output to be lower than the currently-set energy output. Alternatively, the reference energy output may be within an output range of intensity 1 to intensity 5 that can be set for the generator 300. In this case, the instruction to increase the energy output to be greater than the reference energy output is an instruction to set the energy output to be higher than intensity 5, and the instruction to decrease the energy output to be lower than the reference energy output is an instruction to set the energy output to be lower than intensity 1.

Figure 8:
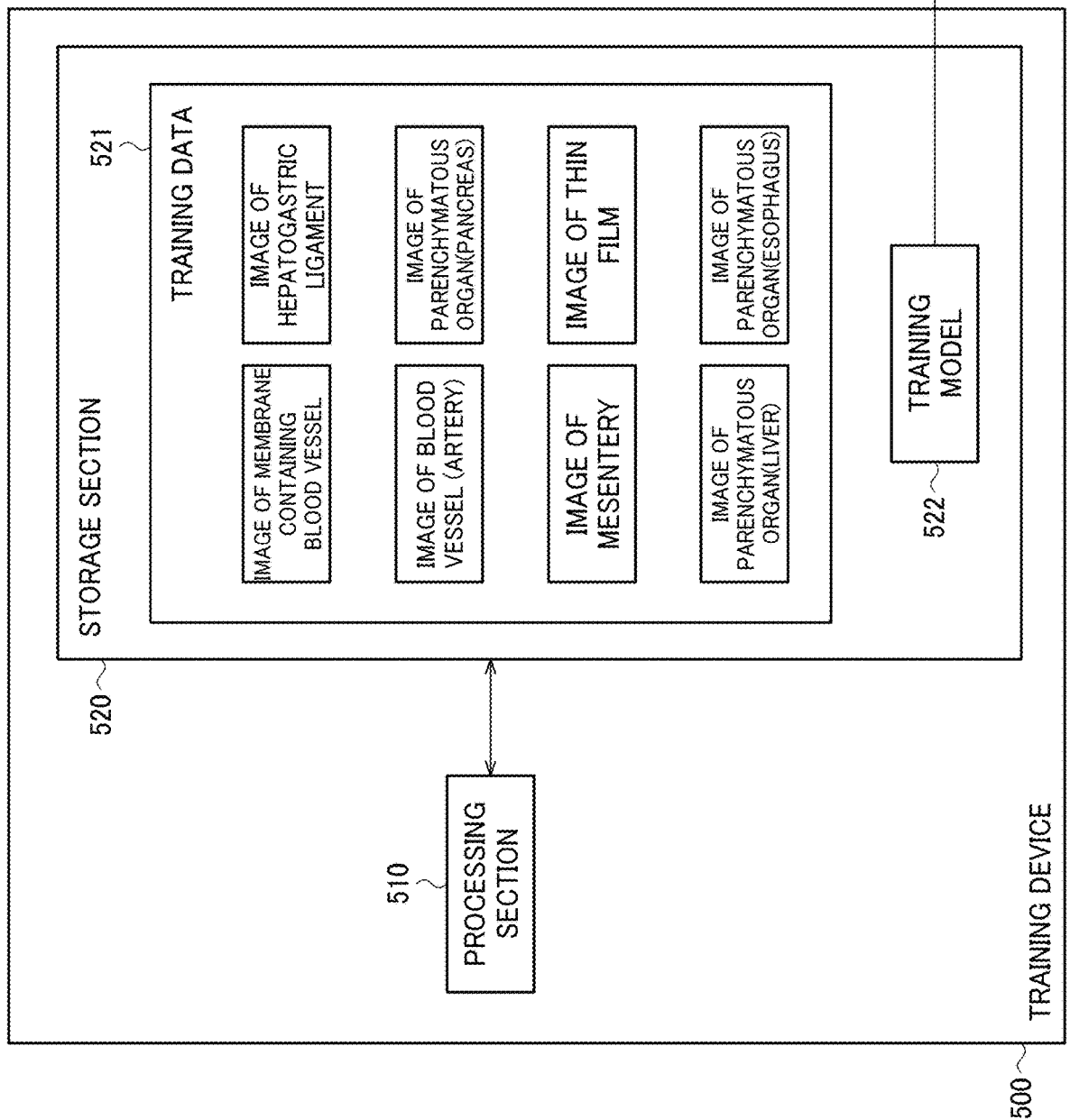
FIG. 8 is a configuration example of a training device.

FIG. 8 is a configuration example of a training device 500 that performs machine learning of the tissue recognition process. The training device 500 includes a processing section 510 and a storage section 520. The training device 500 is implemented by an information processing device, such as a PC, a server device, or the like. Alternatively, the training device 500 may be implemented by a cloud system that performs the processes with one or a plurality of information processing devices connected via a network.

The processing section 510 is a processor such as a CPU, and the storage section 520 is a storage device such as a semiconductor memory, a hard disc drive, or the like. The storage section 520 stores a training model 522 and training data 521, and the processing section 510 uses the training data 521 to train the training model 522 to generate a trained model 121. Specifically, the training data includes image data of a plurality of training images and correct answer data associated with each training image. The plurality of training images include endoscope images in which one or a plurality of tissues and one or a plurality of energy devices are captured. Such an endoscope image is also referred to as a training device tissue image. The plurality of training images may also include an endoscope image in which one or a plurality of tissues are captured and no energy device is captured. Such an endoscope image is also referred to as a training tissue image. The correct answer data are annotations in the segmentation (region detection), annotations in the detection (location detection), correct answer labels in the classification (classification), or correct answer labels in the regression (regression analysis). The processing section 510 inputs training images to the inference process by the training model 522, and provides feedback to the training model 522 based on the error between the results of the inference process and the correct answer data. The processing section 510 repeats this process with a large number of training data to generate the trained model 121. The trained model 121 thus generated is transferred to the storage section 120 of the controller 100.

In the case where the control section 110 recognizes the tissue type, the training data 521 includes, as training images, images of blood vessel-containing membrane, images of hepatogastric ligament, images of blood vessel (artery), images of parenchymal organ (pancreas), images of mesentery, images of thin films, images of parenchymatous organ (liver), images of parenchymatous organ (esophagus), and the like. The training data 521 also includes, as correct answer data, annotations attached to the region of the tissue captured in each training image, or labels indicating the type of the tissue captured in each training image.

Although FIGS. 7 and 8 separately show the inference phase and the training phase of the recognition process using machine learning, the inference phase and the training phase may be mixed in the following description. In this case, the control section 110 performs the process of the inference phase and the training device 500 performs the process of the training phase, as in the case described above.

FIG. 9 is an example of a first recognition process when the control section 110 recognizes the tissue type. The control section 110 performs tissue region recognition by segmentation and treatment tool distal end region detection by segmentation, and then synthesizes these results to recognize the tissue type gripped by the jaw. FIG. 9 shows an example in which the recognition concluded that "the tissue type is a membrane tissue". The control section 110 may display the results of segmentation, the tissue type recognition results, or both, in a monitor.

Specifically, the trained model 121 includes a first trained model for performing tissue region recognition and a second trained model for performing treatment tool distal end region detection. The control section 110 detects the region for each tissue type from the endoscope image by the image recognition process using the first trained model. This enables mapping of the tissue type in the endoscope image. FIG. 9 shows an example of detection of a stomach region, a liver region, and a membrane region from an endoscope image. In the training phase, the training device 500 generates the first trained model using, as training data, the endoscope image in which annotation is added to the region of each tissue type. The control section 110 detects the region of the jaw at the distal end of the energy device from the endoscope image by the image recognition process using the second trained model. As a result, the position gripped by the jaw in the endoscope image is specified. In the training phase, the training device 500 generates a second trained model using, as training data, the endoscope image in which annotation is added to the region of the jaw at the distal end of the energy device. The system may be structured so that the tissue region recognition and the treatment tool distal end region detection are achieved by a single trained model without separating the trained model for each process.

The control section 110 recognizes the type of the tissue gripped by the jaw by determining which one of the one or a plurality of tissue regions detected by the tissue region recognition overlaps with the region of the jaw detected by the treatment tool distal end region detection.

Figure 10:
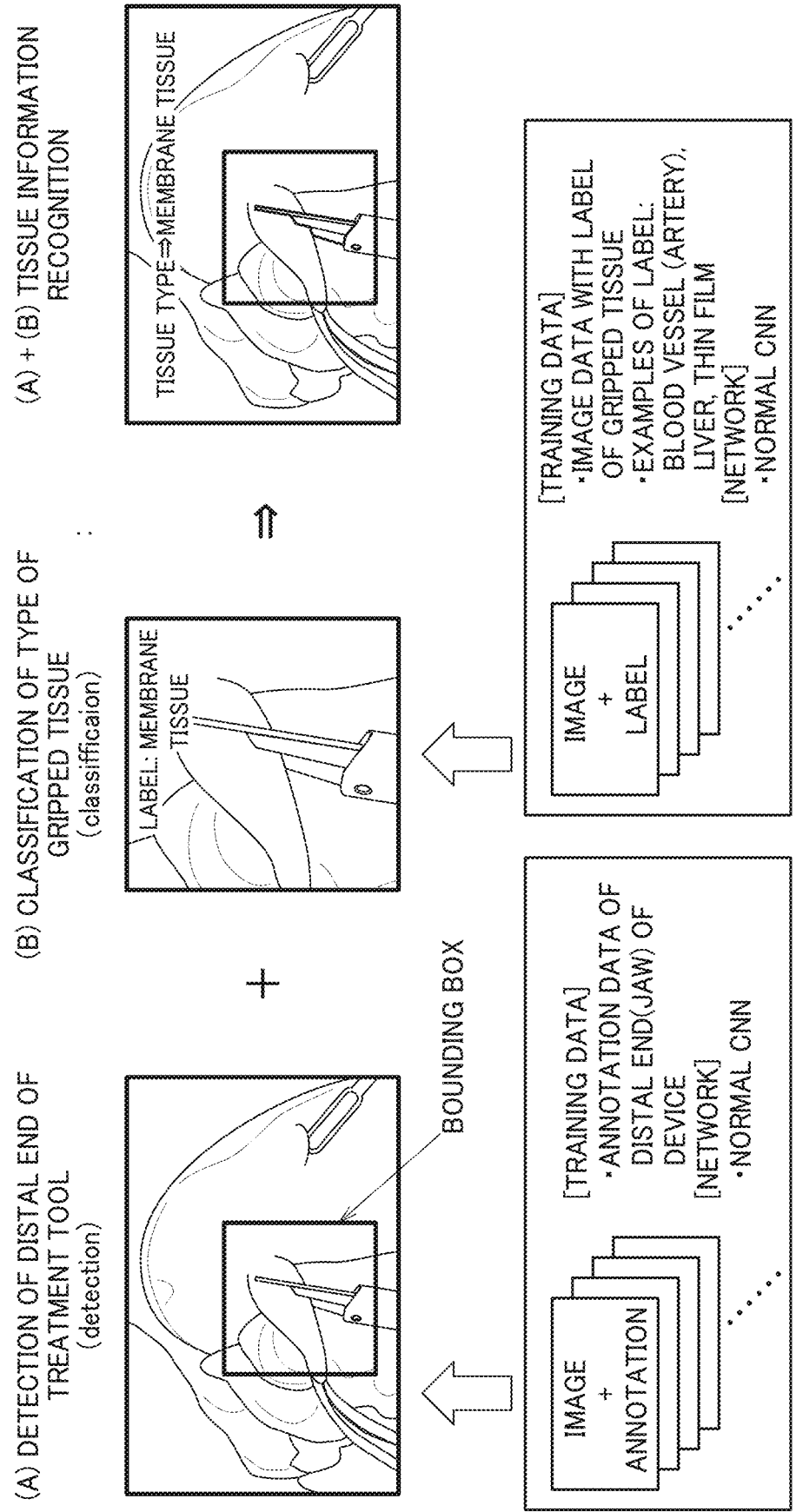
FIG. 10 is an example of a second recognition process when a control section recognizes a tissue type.

FIG. 10 is an example of a second recognition process when the control section 110 recognizes the tissue type. The control section 110 recognizes the type of the tissue gripped by the jaw by detecting the distal end of the treatment tool by the detection, and classifying the type of the gripped tissue by the classification.

Specifically, the trained model 121 includes a first trained model for performing detection of the distal end of treatment tool and a second trained model for performing classification of the tissue type of gripped tissue. The control section 110 detects the position of the jaw from the endoscope image by the image recognition process using the first trained model, and generates a bounding box that contains the jaw. As a result, the position of gripping and the surrounding region of interest are specified. In the training phase, the training device 500 generates the first trained model using, as training data, the endoscope image in which the bounding box containing the jaw is added. The control section 110 cuts out the image in the bounding box from the endoscope image and inputs the image to the image recognition process using the second trained model, thereby classifying the type of the tissue captured in the image in the bounding box. As a result, it is possible to specify the type of the gripped tissue in the image in the bounding box. In the training phase, the training device 500 generates a second trained model using, as training data, an endoscope image in which a label indicating the type of the tissue gripped by the jaw is added.

The control section 110 outputs the result of the classification of the type of the gripped tissue as the recognition result of the type of the tissue gripped by the jaw.

FIG. 11 is an example of adjustment of output when the control section 110 recognizes the tissue type. The control section 110 reduces the energy output from that in the normal condition when the tissue type recognition result indicates a tissue that is more easily cut by the energy device, such as a thin film. The normal condition means the reference energy output described above. The control section 110 increases the energy output from that in the normal condition when the tissue type recognition result indicates a tissue that is not easily cut by the energy device, such as a esophagus. The control section 110 does not change the energy output from that in the normal condition when the recognition result of the tissue type indicates any other tissue.

FIG. 31 is an example of adjustment of output in the case of using a combination device. If multiple types of output adjustment are written in the column of "output", the control section 110 performs one of those output adjustments. For example, when a "thin film" is recognized from an image, the control section 110 adjusts the output in one of the following ways: (1) "reduce the HF output level", (2) "reduce the HF output time, reduce the level of S&C mode", or (3) "perform US-only output". "HF" means high frequency, "S&C" means seal and cut, and "US" means ultrasonic. The control section 110 adjusts the energy output based on the results of the image recognition process; however, as described later, the control section 110 may adjust the energy output also using device information.

5. Example of Processing When Recognizing Tissue Condition

Figure 12:
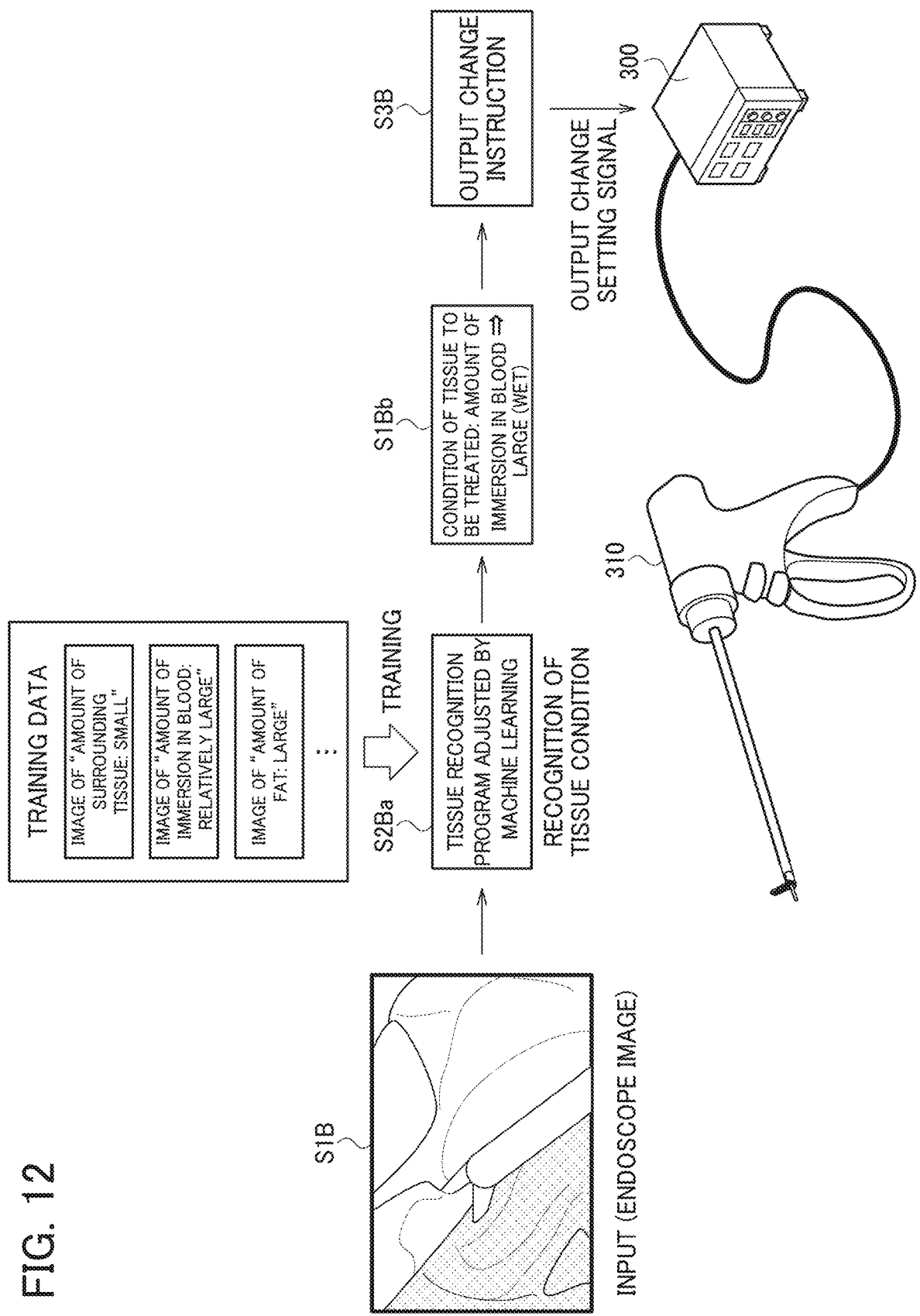
FIG. 12 is an example of processing when a control section recognizes a tissue condition.

FIG. 12 is an example of processing when the control section 110 recognizes the tissue condition. In this example, the parts different from those in the process example of FIG.

7 are mainly described, and the parts similar to those in the process example of FIG. 7 are omitted as appropriate.

As shown in S1B, an endoscope image is input to the control section 110. As shown in S2Ba, the control section 110 recognizes the tissue condition from the endoscope image by executing a tissue recognition program adjusted by machine learning. Specifically, the control section 110 recognizes the condition of the tissue gripped by the jaws of the bipolar device. A tissue condition refers to a condition that can affect heat diffusion during the treatment by an energy device, i.e., a condition that can change the degree of heat diffusion depending thereon. Examples of the tissue condition include the amount of surrounding tissue of the tissue gripped by the jaw, the amount of immersion of the tissue gripped by the jaw or the amount of immersion of surrounding tissue thereof, the amount of fat of the tissue gripped by the jaw, and the like. The amount of immersion is an amount of liquid covering the tissue, e.g., an amount of immersion in body fluids such as blood or lymphatic fluid. As shown in S2Bb, the control section 110 outputs the tissue condition recognized from the endoscope image. FIG. 12 shows an example of large amount of immersion in blood, i.e., the case in which the tissue surface is recognized as wet.

As shown in S3B, the control section 110 gives an output change instruction according to the tissue condition recognized from the endoscope image. The method of output change instruction is the same as that of S3A in FIG. 7.

The training data 521 in the training phase includes, as training images, images with a large amount or a small amount of surrounding tissues, images with a large amount or a small amount of liquid immersion, images with a large amount or a small amount of fat, and the like. The training data 521 also includes, as correct answer data, labels indicating the condition of the tissue captured in each training image.

Figure 13:
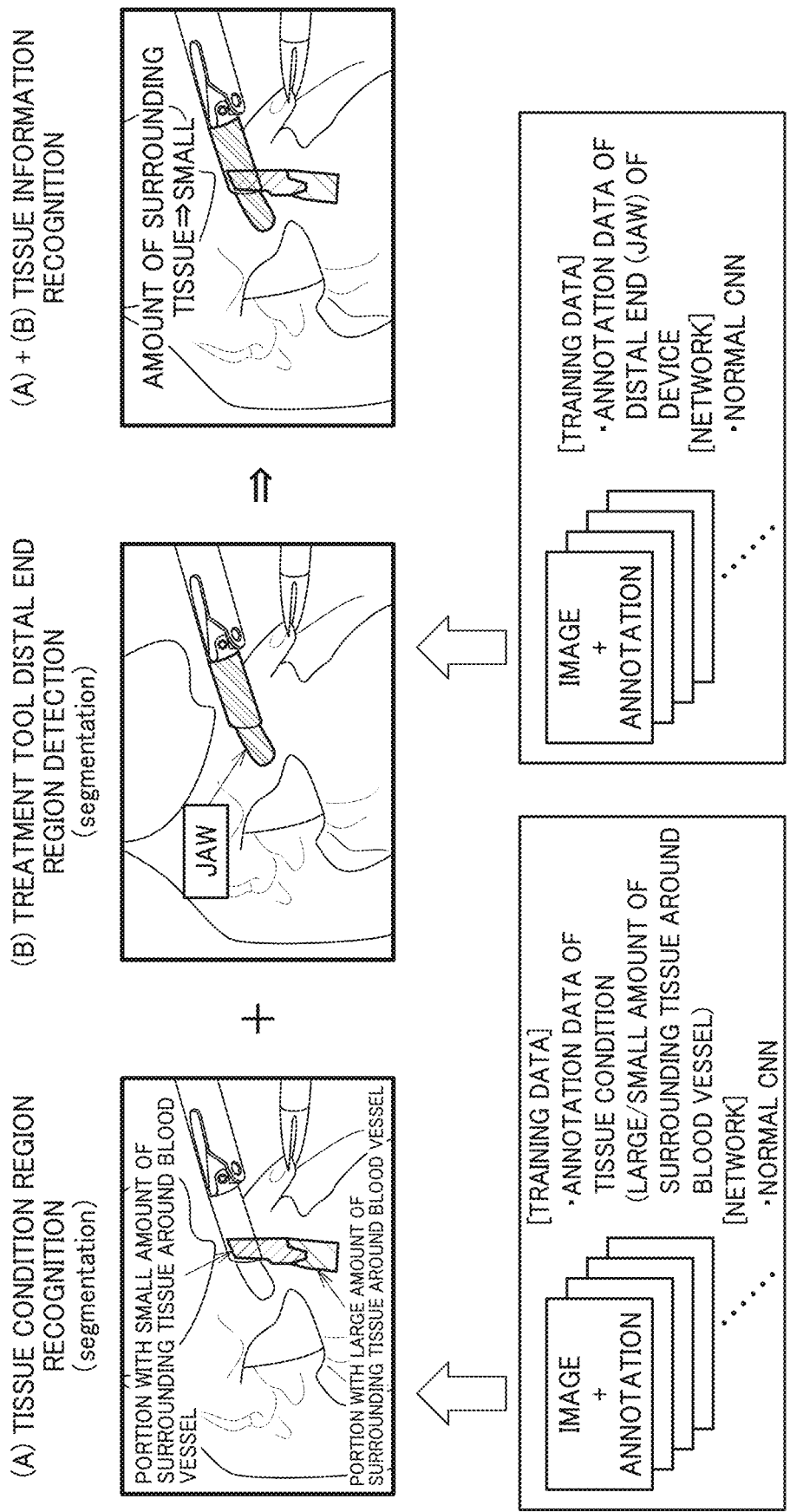
FIG. 13 is an example of a first recognition process when a control section recognizes a tissue condition.
Figure 14:
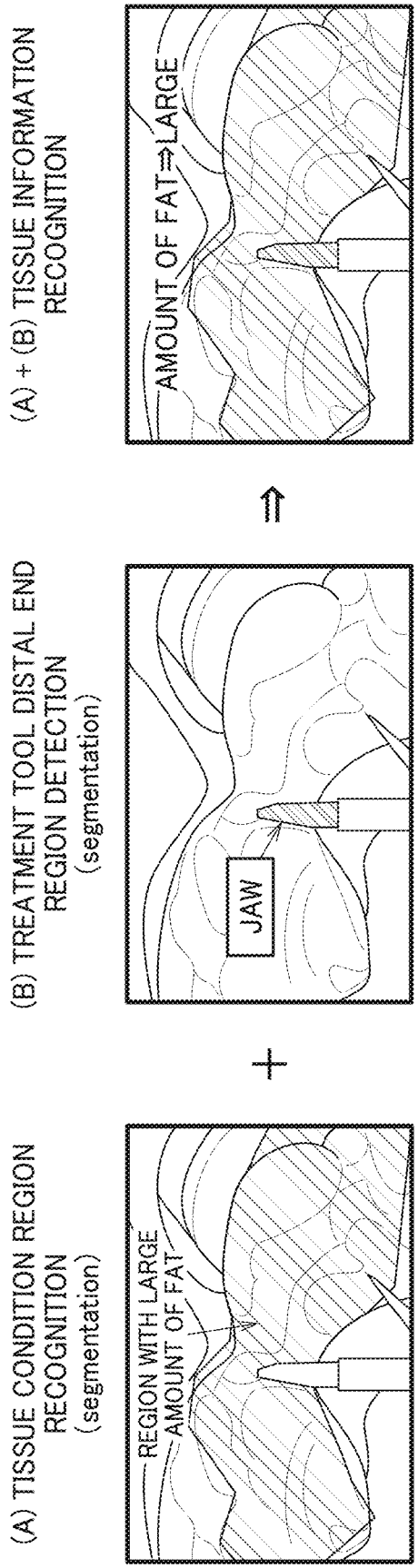
FIG. 14 is an example of a first recognition process when a control section recognizes a tissue condition.

FIGS. 13 to 15 show an example of a first recognition process when the control section 110 recognizes the tissue condition. FIG. 13 shows an example of recognizing the amount of surrounding tissue as a tissue condition. The control section 110 performs tissue condition region recognition by segmentation and treatment tool distal end region detection by segmentation, and then synthesizes these results to recognize the condition of the tissue gripped by the jaw. FIG. 13 shows an example in which the amount of surrounding tissue is recognized as small. The control section 110 may display the results of segmentation, the tissue condition recognition results, or both, in a monitor.

Specifically, the trained model 121 includes a first trained model for performing tissue condition region recognition and a second trained model for performing treatment tool distal end region detection. The control section 110 detects the region for each tissue condition from the endoscope image by the image recognition process using the first trained model. This enables mapping of the tissue condition in the endoscope image. FIG. 13 shows an example in which a region with a small amount of surrounding tissue around blood vessel and a region with a large amount of surrounding tissue around blood vessel are detected. In the training phase, the training device 500 generates the first trained model using, as training data, the endoscope image in which annotation is added to the region of each tissue condition. In FIG. 13, the training data includes images in which annotations are added to either or both of the region with a large amount of surrounding tissue around blood vessel and the region with a small amount of surrounding tissue around blood vessel. The control section 110 detects the region of the jaw at the distal end of the energy device from the endoscope image by the image recognition process using the second trained model. This process is similar to the treatment tool distal end region detection in FIG. 9.

The control section 110 recognizes the condition of the tissue gripped by the jaw by determining which one of the one or a plurality of tissue condition regions detected by the tissue condition region recognition overlaps with the region of the jaw detected by the treatment tool distal end region detection.

FIG. 14 shows an example of recognizing the amount of fat as a tissue condition. FIG. 14 shows an example in which the control section 110 detects a region with a large amount of fat in the tissue condition region recognition and determines that "the amount of fat is large" in the recognition of tissue condition. The training data in the training phase includes images in which annotations are added to either or both of the region with a large amount of fat and the region with a small amount of fat. FIG. 15 shows an example of recognizing the amount of immersion as a tissue condition. FIG. 15 shows an example in which a region with a large amount of immersion, i.e., a wet region, is detected in the tissue condition region recognition, and it was determined that "the amount of immersion is large" in the recognition of tissue condition. The training data in the training phase includes images in which annotations are added to either or both of the region with a large amount of immersion and the region with a small amount of immersion.

Figure 16:
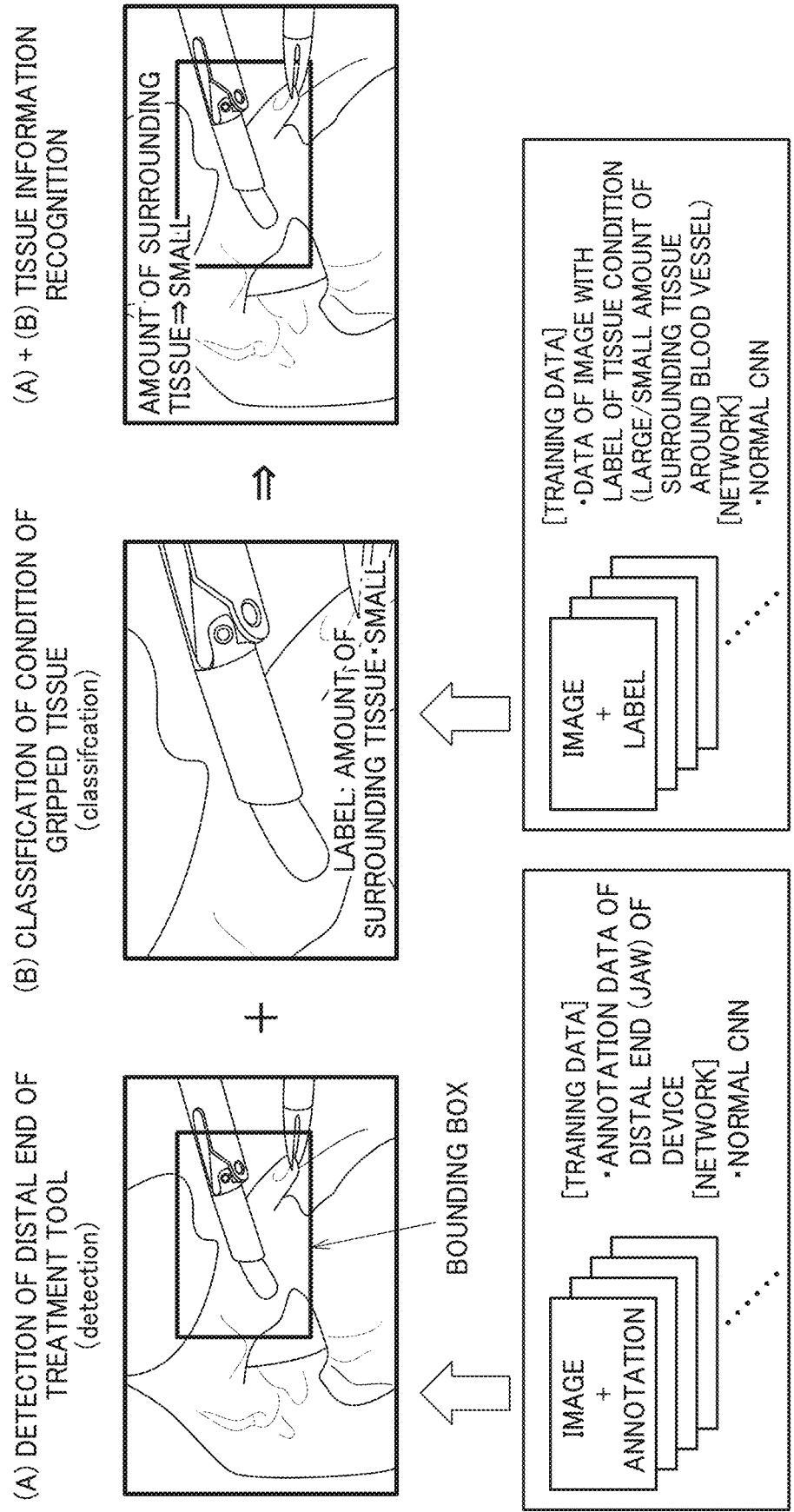
FIG. 16 is an example of a second recognition process when a control section recognizes a tissue condition.

FIG. 16 is an example of a second recognition process when the control section 110 recognizes the tissue condition. The control section 110 recognizes the condition of the tissue gripped by the jaw by detecting the distal end of the treatment tool by the detection, and classifying the condition of the gripped tissue by the classification.

Specifically, the trained model 121 includes a first trained model for performing detection of the distal end of treatment tool and a second trained model for performing classification of the condition of gripped tissue. The control section 110 detects the position of the jaw from the endoscope image by the image recognition process using the first trained model, and generates a bounding box that contains the jaw. This process is similar to the detection of treatment tool distal end in FIG. 10. The control section 110 cuts out the image in the bounding box from the endoscope image and inputs the image to the image recognition process using the second trained model, thereby classifying the condition of the tissue captured in the image in the bounding box. As a result, it is possible to specify the condition of the gripped tissue in the image in the bounding box. In the training phase, the training device 500 generates a second trained model using, as training data, an endoscope image in which a label indicating the condition of the tissue gripped by the jaw is added.

The control section 110 outputs the results of the classification of the condition of the gripped tissue as the recognition results of the condition of the tissue gripped by the jaw.

FIG. 17 is an example of adjustment of output when the control section 110 recognizes the tissue condition. The control section 110 reduces the energy output from that in the normal condition when the tissue condition recognition result indicates a state in which secure sealing by taking time by the energy device is necessary. The condition is, for example, a condition with a small amount of surrounding tissue. The control section 110 increases the energy output from that in the normal condition when the recognition result of the tissue condition indicates a tissue condition that is not easily cut by the energy device. The condition is, for example, a condition with a large amount of fat or a condition with a large amount of immersion in blood. The control section 110 does not change the energy output from that in the normal condition when the recognition result of the tissue condition indicates any other conditions.

FIG. 32 is an example of adjustment of output in the case of using a combination device. If multiple types of output adjustment are written in the column of "output", the control section 110 performs one of those output adjustments. The control section 110 adjusts the energy output based on the results of the image recognition process; however, as described later, the control section 110 may adjust the energy output also using device information.

6. Example of Processing When Recognizing Amount of Gripped Tissue

FIG. 18 is an example of processing when the control section 110 recognizes the amount of gripped tissue. In this example, the parts different from those in the process example of FIG. 7 are mainly described, and the parts similar to those in the process example of FIG. 7 are omitted as appropriate.

As shown in S1C, an endoscope image is input to the control section 110. As shown in S2Ca, the control section 110 recognizes the amount of gripped tissue from the endoscope image by executing a tissue recognition program adjusted by machine learning. Specifically, the control section 110 recognizes the amount of the gripped tissue when the tissue is gripped by the jaws of the bipolar device. The amount of the gripped tissue is the length of the portion of the jaw gripping the tissue or the percentage of the portion of the jaw gripping the tissue relative to the total length of the jaw. A condition in which the jaw grips the tissue to its shallow depth is called a short pitch, while a condition in which the jaw grips the tissue to its deep depth is called a long pitch. Herein, the case in which the amount of the gripped tissue is equal to or less than the threshold is called a short pitch, and the case where the amount of the gripped tissue is equal to or more than the threshold is called a long pitch. As shown in S2Cb, the control section 110 recognizes whether it is the case of a short pitch or a long pitch by comparing the amount of gripped tissue recognized from the endoscope image with the threshold. FIG. 18 shows an example in which the amount of the gripped tissue is recognized as a short pitch.

As shown in S3C, the control section 110 gives an output change instruction according to the amount of gripped tissue recognized from the endoscope image. The method of output change instruction is the same as that of S3A in FIG. 7.

The training data 521 in the training phase includes images with various amounts of gripped tissue as training images. For example, the training data 521 includes short pitch images in which the amount of gripped tissue is equal to or less than the threshold and long pitch images in which the amount of gripped tissue is equal to or more than the threshold. The training data 521 also includes, as correct answer data, labels indicating the amount of gripped tissue captured in each training image. The label may be, for example, information indicating the length of the portion of the jaw gripping the tissue or the percentage of the portion of the jaw gripping the tissue relative to the total length of the jaw, or indicating whether it is a long pitch or a short pitch.

FIG. 19 is an example of a first recognition process when the control section 110 recognizes the amount of gripped tissue. The control section 110 recognizes the amount of the tissue gripped by the jaw by detecting the distal end of the treatment tool by the detection, and classifying the amount of gripped tissue by the classification. The classification of the amount of gripped tissue means classifying the amount of tissue gripped by the jaw captured in the endoscope image into one of a plurality of classes. The plurality of classes refer to gripping amount ranges separated in stages. For example, the classes are separated by predetermined length increments, such as 1 mm increments, or by predetermined percentage increments, such as 10% increments when the total length of the jaw is regarded 100%.

Specifically, the trained model 121 includes a first trained model for performing detection of the distal end of treatment tool and a second trained model for performing classification of the amount of gripped tissue. The control section 110 detects the position of the jaw from the endoscope image by the image recognition process using the first trained model, and generates a bounding box that contains the jaw. This process is similar to the detection of treatment tool distal end in FIG. 10. The control section 110 cuts out the image in the bounding box from the endoscope image and inputs the image to the image recognition process using the second trained model, thereby classifying the amount of tissue gripped by the jaw captured in the image in the bounding box. As a result, it is possible to specify the amount of the gripped tissue in the image in the bounding box. In the training phase, the training device 500 generates a second trained model using, as training data, an endoscope image in which a label indicating the amount of the tissue gripped by the jaw is added.

By comparing the result of the classification of the amount of the gripped tissue with the threshold, the control section 110 determines whether it is a short pitch or a long pitch, and outputs the determination result as the recognition result of the amount of gripped tissue. FIG. 19 shows an example in which it is determined as a short pitch.

FIG. 20 is an example of a second recognition process when the control section 110 recognizes the amount of gripped tissue. The control section 110 estimates the quantitative positional relationship between the feature point of the distal end section of the treatment tool and the tissue gripped by the jaw by means of classification or regression, and calculates the amount of gripped tissue from the estimated results.

Specifically, the control section 110 estimates the distance x [mm] from the base end of the jaw to the proximal end of the gripped tissue by the image recognition process using the trained model 121. The proximal end of the gripped tissue is an end of the tissue gripped by the jaw that is closest to the base end of the jaw. When the classification is used, the control section 110 classifies the distance x into one of the plurality of classes. The plurality of classes refer to distance ranges separated in stages. When the regression is used, the control section 110 estimates the distance x itself, which is from the base end of the jaw to the proximal end of the gripped tissue, from the endoscope image. In the training phase, the training device 500 generates a trained model 121 using, as training data, an endoscope image in which a label of distance information indicating the distance x from the base end of the jaw to the proximal end of the gripped tissue is added. The distance information is the class to which the distance x belongs when the classification is used, or the distance x when the regression is used.

The control section 110 performs calculation according to the equation: the amount of gripped tissue=total jaw length−x, using the recognized distance x. By comparing the amount of gripped tissue with the threshold, the control section 110 determines whether it is a short pitch or a long pitch and outputs the determination result as the recognition result of the amount of gripped tissue. FIG. 20 shows an example in which it is determined as a short pitch.

FIG. 21 is an example of adjustment of output when the control section 110 recognizes the amount of gripped tissue. The control section 110 reduces the energy output from that in the normal condition when the recognition result of the amount of gripped tissue indicates an amount that is more easily cut by the energy device. For example, when the control section 110 recognizes a short pitch in which the amount of gripped tissue is equal to or less than the threshold, the control section 110 reduces the energy output from that in the normal condition. The control section 110 does not change the energy output from that in the normal condition when the recognition result of the amount of gripped tissue indicates any other amounts of gripped tissue.

FIG. 33 is an example of adjustment of output in the case of using a combination device. If multiple types of output adjustment are written in the column of "output", the control section 110 performs one of those output adjustments. The control section 110 adjusts the energy output based on the results of the image recognition process; however, as described later, the control section 110 may adjust the energy output also using device information.

7. Example of Processing When Recognizing Tissue Tension

Figure 22:
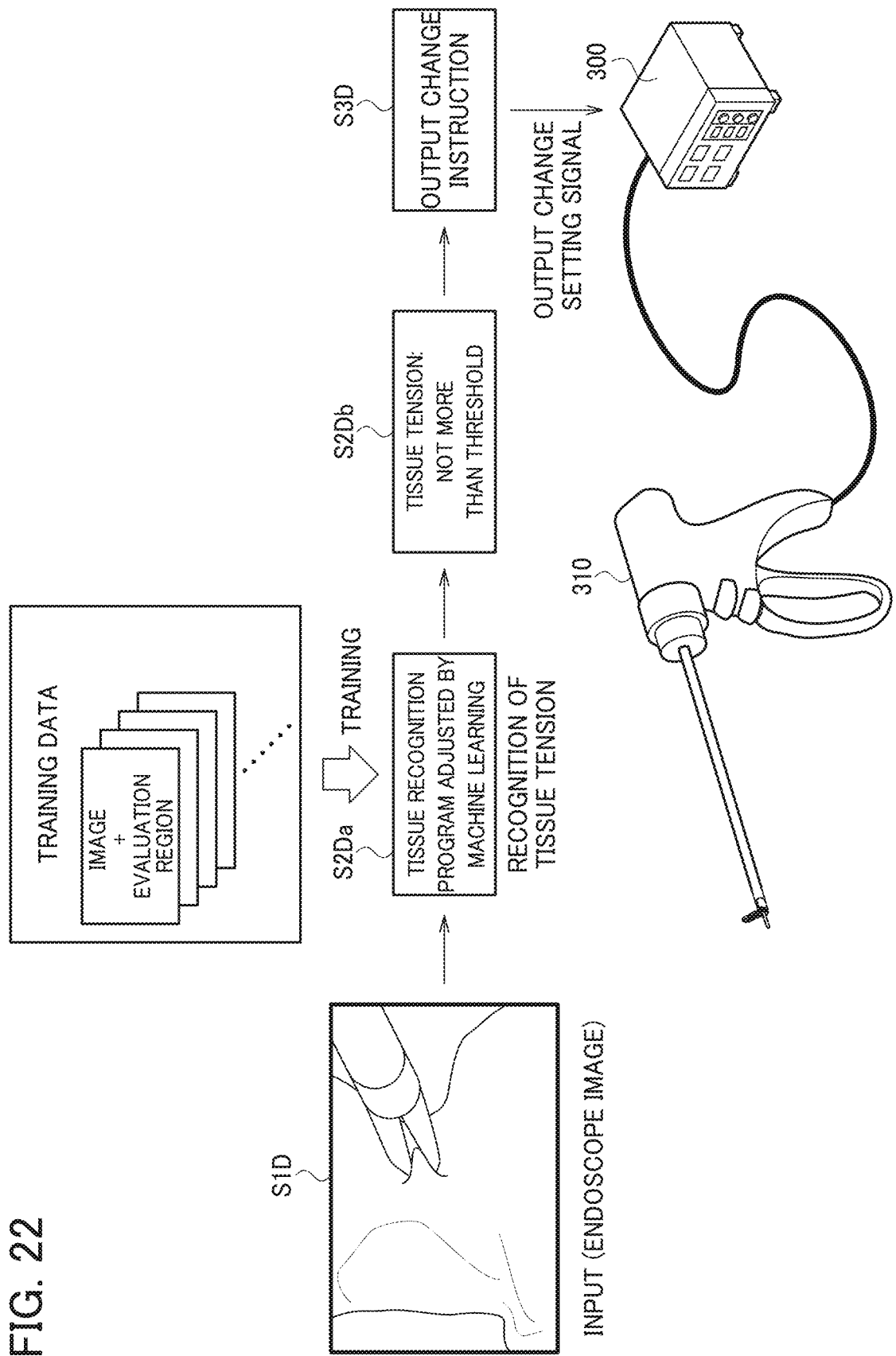
FIG. 22 is an example of processing when a control section recognizes a tissue tension.

FIG. 22 is an example of processing when the control section 110 recognizes the tissue tension. In this example, the parts different from those in the process example of FIG. 7 are mainly described, and the parts similar to those in the process example of FIG. 7 are omitted as appropriate.

As shown in S1D, an endoscope image is input to the control section 110. As shown in S2Da, the control section 110 recognizes the tissue tension from the endoscope image by executing a tissue recognition program adjusted by machine learning. Specifically, the tissue tension is the tension applied to the tissue gripped by the jaws of the bipolar device. This tension is generated by the tissue being tracted by the bipolar device or by the tissue being tracted by the forceps or other treatment tools. By applying appropriate tension to the tissue, it is possible to perform an appropriate treatment by the energy device. However, if the tissue tension is inappropriate, for example, the tissue tension is weak, the treatment by the energy device requires a longer period of time, and heat diffusion is more likely to occur. The control section 110 recognizes a score, which is an evaluation value of the tension applied to the tissue gripped by the jaw, from the endoscope image. As shown in S2Db, the control section 110 compares the score of the tissue tension recognized from the endoscope image with the threshold, and outputs the result. FIG. 22 shows an example in which the score of the tissue tension is equal to or less than the threshold, i.e., the tissue tension is recognized as inappropriate.

As shown in S3D, the control section 110 gives an output change instruction according to the tissue tension recognized from the endoscope image. The method of output change instruction is the same as that of S3A in FIG. 7.

The training data 521 in the training phase includes images with various types of tissue tension as training images. The training data 521 also includes, as correct answer data, an evaluation target region for which the score is calculated and the score calculated from the image of the evaluation target region.

Figure 23:
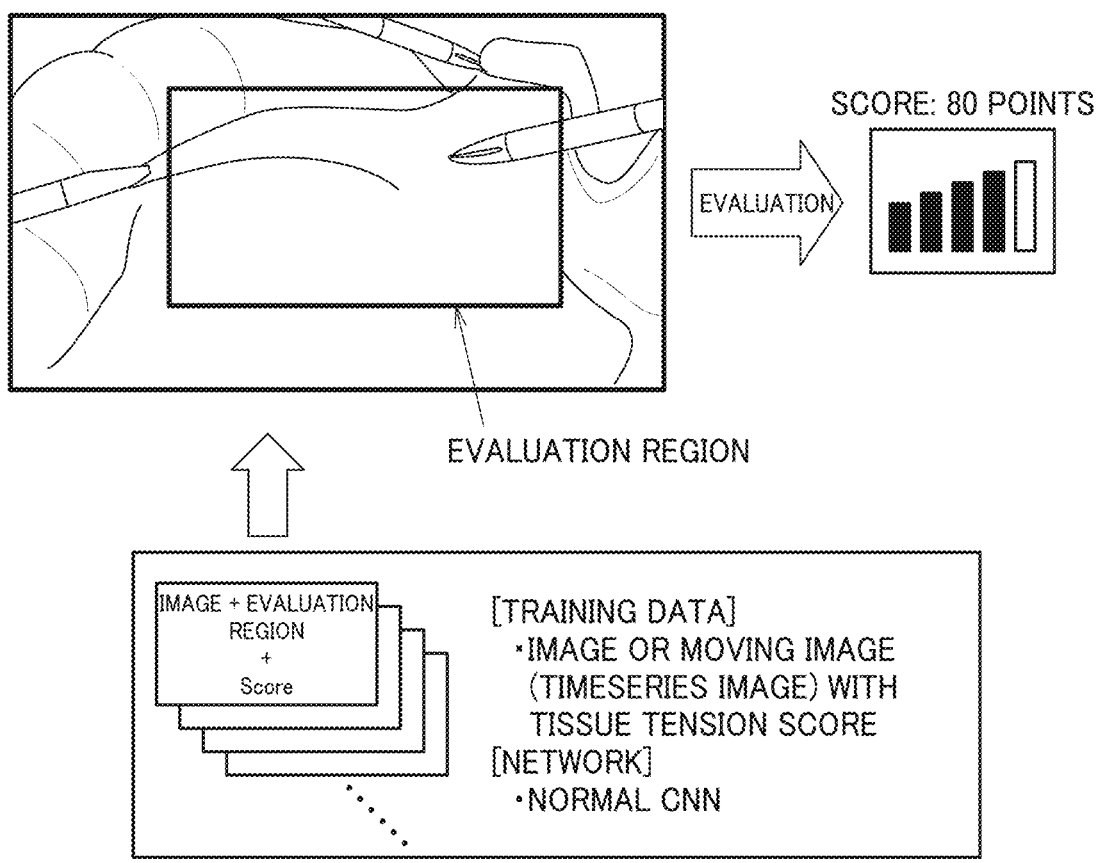
FIG. 23 is an example of a first recognition process when a control section recognizes a tissue tension.

FIG. 23 is an example of a first recognition process when the control section 110 recognizes the tissue tension. The control section 110 outputs a score of the tissue tension by estimating the tissue tension by the regression.

Specifically, the control section 110 detects an evaluation region for use in tension evaluation from the endoscope image using an image recognition process with a trained model, and also estimates the tissue tension from the image within the evaluation region. The control section 110 outputs a high score when an appropriate tension is applied to the tissue during the treatment captured in the endoscope image. In the training phase, the training device 500 generates a trained model using, as training data, an endoscope image in which the information specifying the evaluation region and the score of the tissue tension are added. The training data may also be a moving image, i.e., time-series images. For example, an operation of tissue traction by an energy device or forceps is captured in the moving image, and an evaluation region and a single score are associated with the moving image. The score is quantified based on the hue, saturation, brightness, and luminance of the tissue captured in the endoscope image or moving image, information about movement of the tissue due to traction, or the like. The score obtained from the quantification is added to each endoscope image or each moving image for training.

Figure 24:
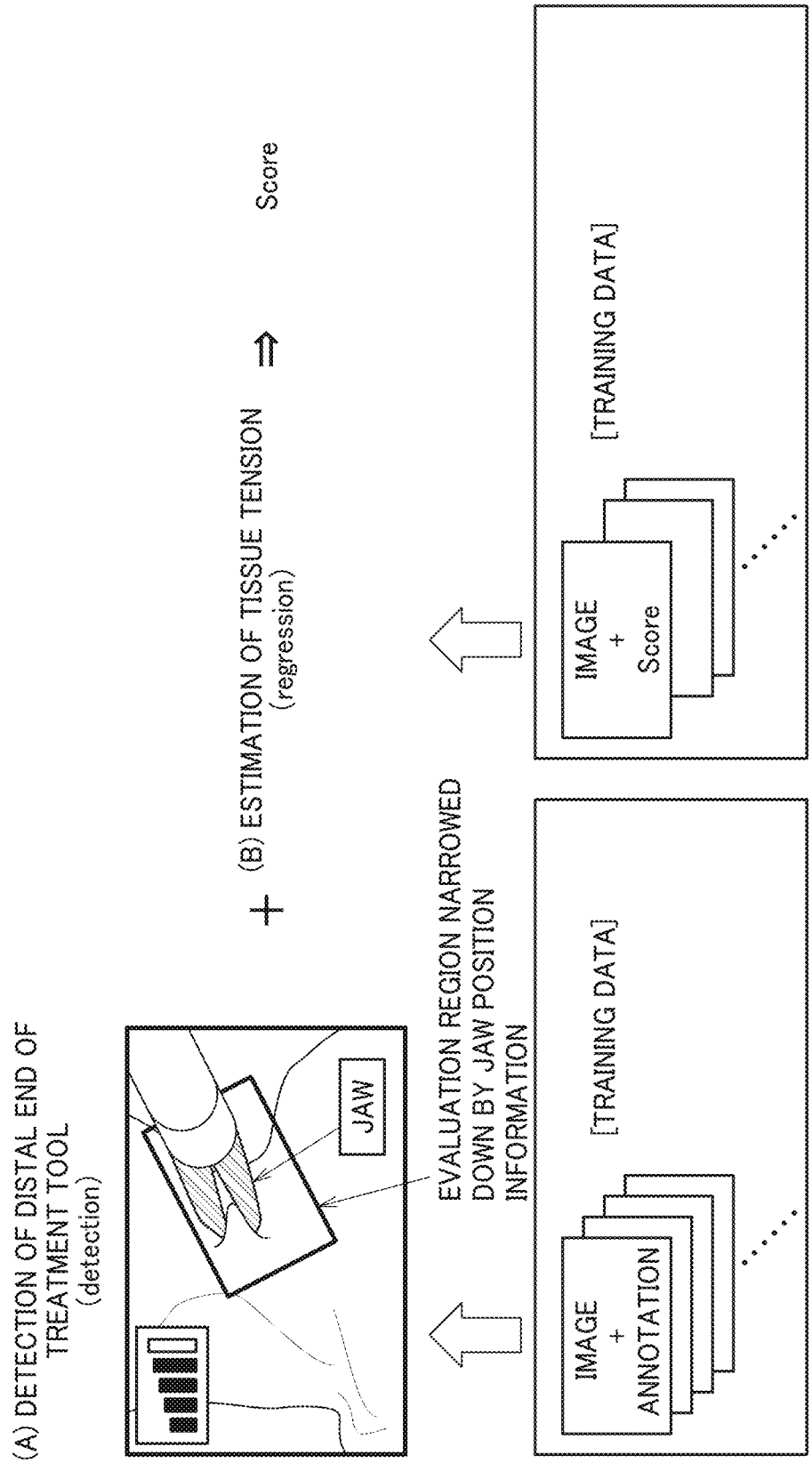
FIG. 24 is an example of a second recognition process when a control section recognizes a tissue tension.

FIG. 24 is an example of a second recognition process when the control section 110 recognizes the tissue tension. The control section 110 detects the distal end of the treatment tool by the detection, sets an evaluation region based on the detection result, and estimates the tissue tension by the regression with respect to the image within the evaluation region.

Specifically, the control section 110 includes a first trained model for performing detection of the distal end of the treatment tool and a second trained model for performing estimation of the tissue tension. The control section 110 detects the position of the jaw from the endoscope image by the image recognition process using the first trained model. The control section 110 sets the evaluation region around the jaw according to a predetermined rule based on the position of the jaw thus detected. The predetermined rule is, for example, setting the evaluation region to the area within a predetermined distance from the center of the position of the jaw, and the like. In the training phase, the training device 500 generates a first trained model using, as training data, an endoscope image in which annotation indicating the position of the distal end of the device, i.e., the position of the jaws of the bipolar device, are added. The control section 110 outputs a tissue tension score by estimating the tissue tension from the image within the evaluation region by the image recognition process using the second trained model. In the training phase, the training device 500 generates a trained model using, as training data, an endoscope image or moving image in which a tissue tension score is added.

FIG. 25 is an example of adjustment of output when the control section 110 recognizes the tissue tension. The control section 110 increases the energy output from that in the normal condition when the tissue tension recognition result indicates a weak tension or a condition in which cutting the tissue by the energy device is not easy. For example, when the tissue tension score is equal to or less than the threshold, the control section 110 increases the energy output from that in the normal condition. The control section 110 does not change the energy output from that in the normal condition when the tissue tension recognition result indicates any other tissue tensions.

FIG. 34 is an example of adjustment of output in the case of using a combination device. If multiple types of output adjustment are written in the column of "output", the control section 110 performs one of those output adjustments. The control section 110 adjusts the energy output based on the results of the image recognition process; however, as described later, the control section 110 may adjust the energy output also using device information.

Figure 26:
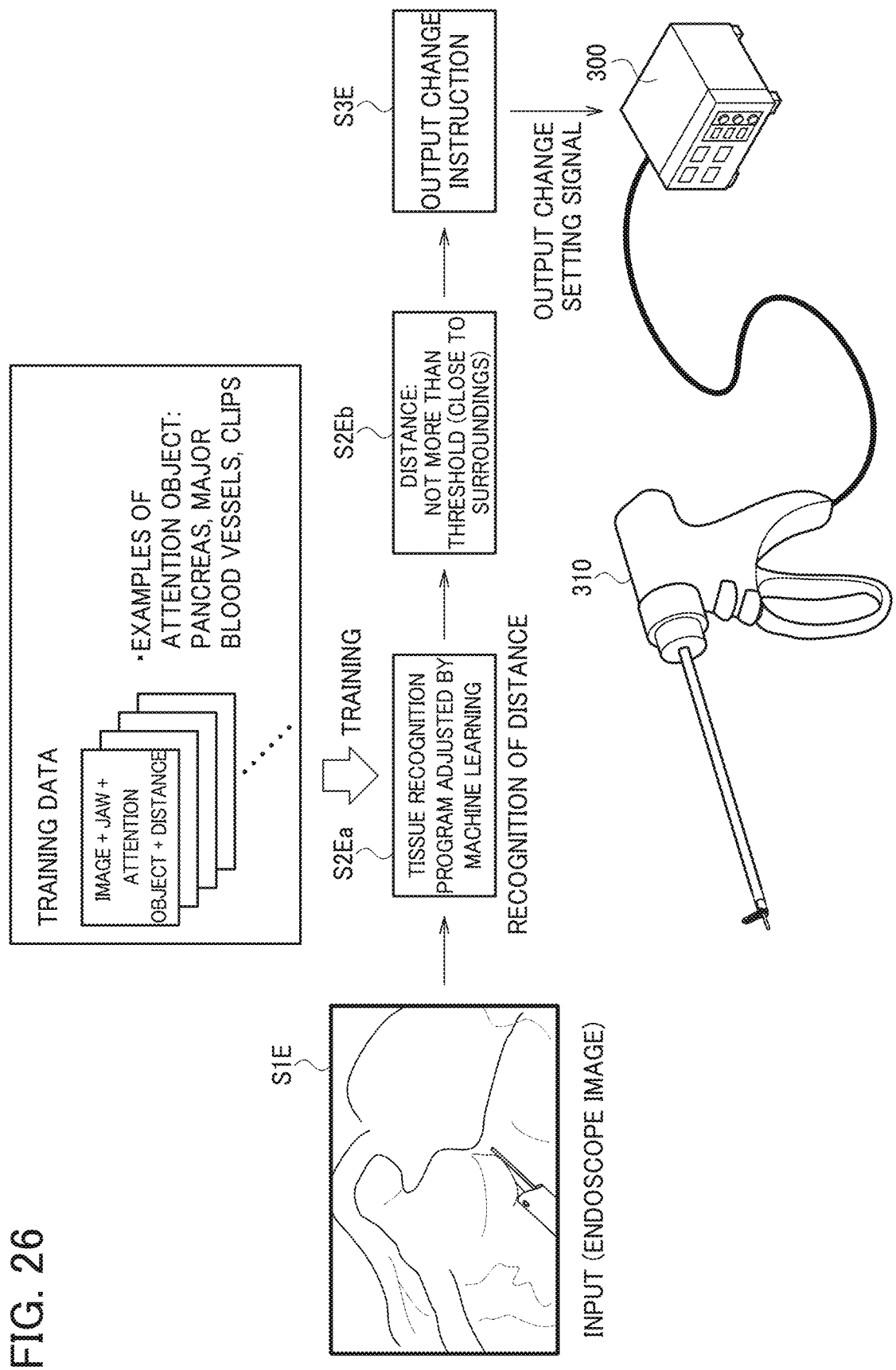
FIG. 26 is an example of processing when a control section recognizes the distance between the distal end section of a treatment tool and an attention object.

8. Example of Processing When Recognizing Distance Between Treatment Tool Distal End Section and Attention Object FIG. 26 is an example of processing when the control section 110 recognizes the distance between the distal end section of a treatment tool and an attention object. In this example, the parts different from those in the process example of FIG. 7 are mainly described, and the parts similar to those in the process example of FIG. 7 are omitted as appropriate.

As shown in S1E, an endoscope image is input to the control section 110. As shown in S2Ea, the control section 110 recognizes the distance between the distal end section of the treatment tool and the attention object from an endoscope image by executing a tissue recognition program adjusted by machine learning. Specifically, the distance between the distal end section of the treatment tool and the attention object refers to the shortest distance between any point in the jaw region and any point in the attention object in the endoscope image. The attention objects are organs, tissues, or instruments for which attention is necessary with respect to the influence of heat diffusion. For example, the attention object may be the pancreas, major blood vessels or clips. If the attention object is an organ or tissue, there is a possibility that the organ or the tissue is influenced by heat diffusion. If the attention object is an instrument, the high temperature of the instrument due to heat diffusion may influence the tissue in contact with the instrument. As shown in S2Eb, the control section 110 compares the distance recognized from the endoscope image with the threshold, and outputs the result. FIG. 26 shows an example in which the distance is equal to or less than the threshold; that is, the distal end section of the treatment tool and the attention object are recognized as close to each other.

As shown in S3E, the control section 110 gives an output change instruction according to the distance recognized from the endoscope image. The method of output change instruction is the same as that of S3A in FIG. 7.

The training data 521 in the training phase includes images of the jaw and various attention objects as training images. The training data 521 also includes, as correct answer data, the distance information indicating the distance between the jaw and the attention object in the image.

Figure 27:
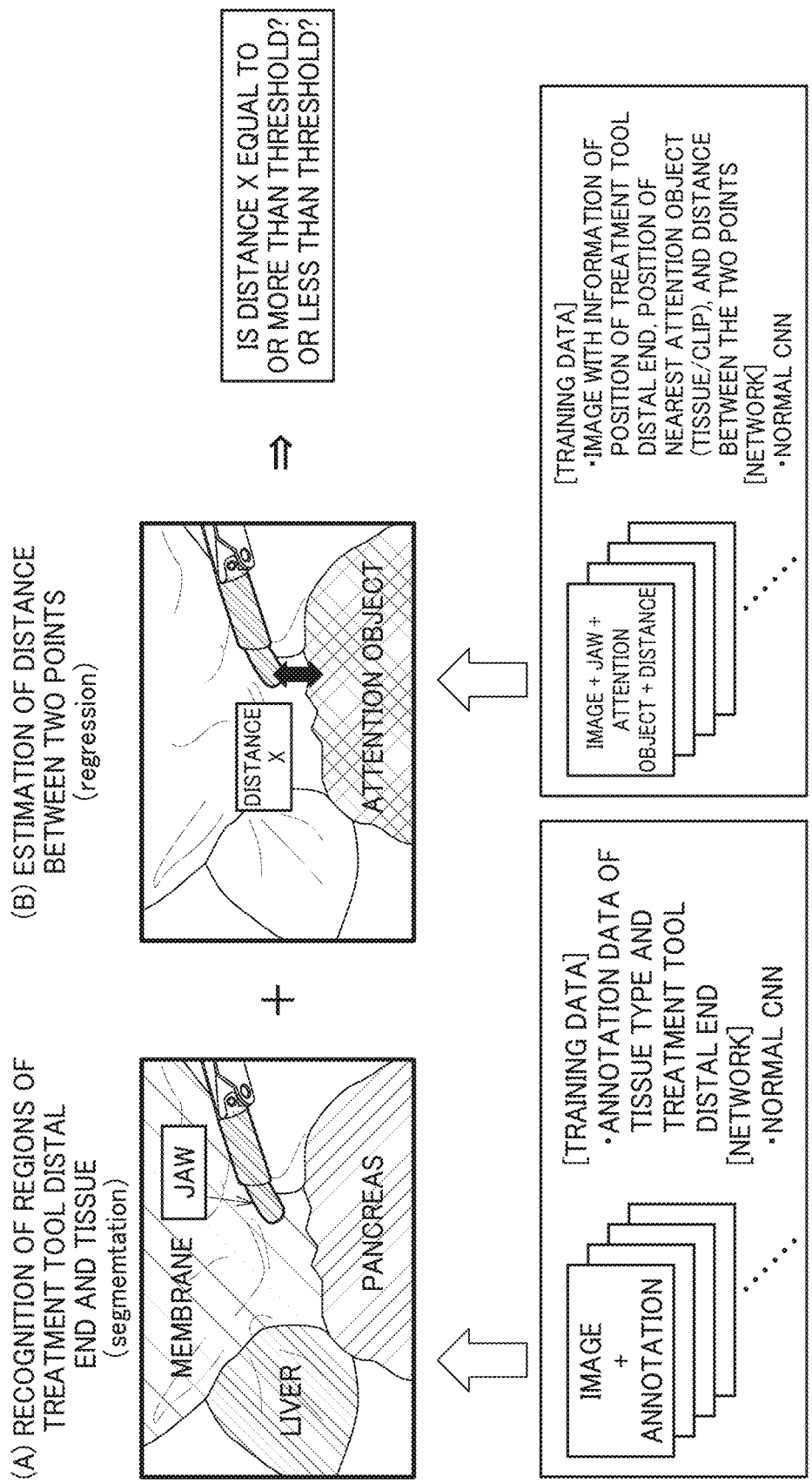
FIG. 27 is an example of a first recognition process when a control section recognizes the distance between the distal end section of a treatment tool and an attention object.

FIG. 27 is an example of a first recognition process when the control section 110 recognizes the distance between the distal end section of a treatment tool and an attention object. The control section 110 performs recognition of the region of the distal end of a treatment tool and the region of the tissue by the segmentation, and estimation of the distance between the two points by the regression. The control section 110 compares the estimated distance between the two points and the threshold, thereby determining whether the distance between the two points is equal to or more than the threshold, or less than the threshold.

Specifically, the trained model 121 includes a first trained model for performing recognition of the regions of the distal end of the treatment tool and the tissue, and a second trained model for performing estimation of the distance between the two points. The control section 110 detects the region of the jaw and the region for each tissue type and the region of the clip from the endoscope image by the image recognition process using the first trained model. FIG. 27 shows an example of detection of the region of the jaw, the region of the membrane, the region of the pancreas, and the region of the liver from an endoscope image. In the training phase, the training device 500 generates the first trained model using, as training data, an endoscope image in which annotation is added to the region of the jaw, the region for each tissue type, and the region of the clip. The control section 110 estimates the distance between the distal end position of the jaw and the position closest to the distal end position of the jaw within the region of the attention object by the image recognition process using the second trained model. The control section 110 compares the estimated distance with the threshold. The attention objects are tissues, organs, or instruments that have been determined as attention objects in advance from among the tissues, organs, or instruments detected by the segmentation. FIG. 27 shows an example in which the pancreas is set as an attention object. In the training phase, the training device 500 generates the second trained model using, as training data, an endoscope image of the jaw and the attention object having a label of distance information indicating the distance between the jaw and the attention object.

FIG. 28 is an example of adjustment of output when the control section 110 recognizes the distance between the distal end section of a treatment tool and an attention object. The control section 110 reduces the energy output from that in the normal condition when the distance recognition result indicates that the distance between the device and the attention object is close. For example, when the recognized distance is equal to or less than the threshold, the control section 110 reduces the energy output from that in the normal condition. The control section 110 does not change the energy output from that in the normal condition when the distance recognition result indicates any other distances.

FIG. 35 is an example of adjustment of output in the case of using a combination device. If multiple types of output adjustment are written in the column of "output", the control section 110 performs one of those output adjustments.

9. Display Example

FIG. 29 is an example of displaying information regarding energy output adjustment. The control section 110 superimposes the information regarding energy output adjustment on the endoscope image to generate a display image 150, and performs processing of displaying the display image 150 on a monitor. The display image 150 may be shown on a display 230 of the endoscope system 200 or on a separate display for navigation display.

As the information regarding the energy output adjustment, either or both of the recognition results of the image recognition process and the output information selected based on the recognition results are superimposed on the endoscope image. The recognition results of the image recognition process are, for example, the detected tissue region 151, jaw region 152, or text information 153 indicating the tissue gripped by the jaw or the amount of the gripped tissue, or the like. Instead of the jaw region 152, a bounding box indicating the position of the jaw may be displayed. The output information is, for example, an image 154 indicating the selected output sequence. The output information may also be a display icon 155 indicating the selected energy output setting. The display icon 155 includes, for example, a plurality of icons indicating a plurality types of energy output setting, and a highlight display 156 that emphasizes the icon of the determined energy output setting.

Figure 30:
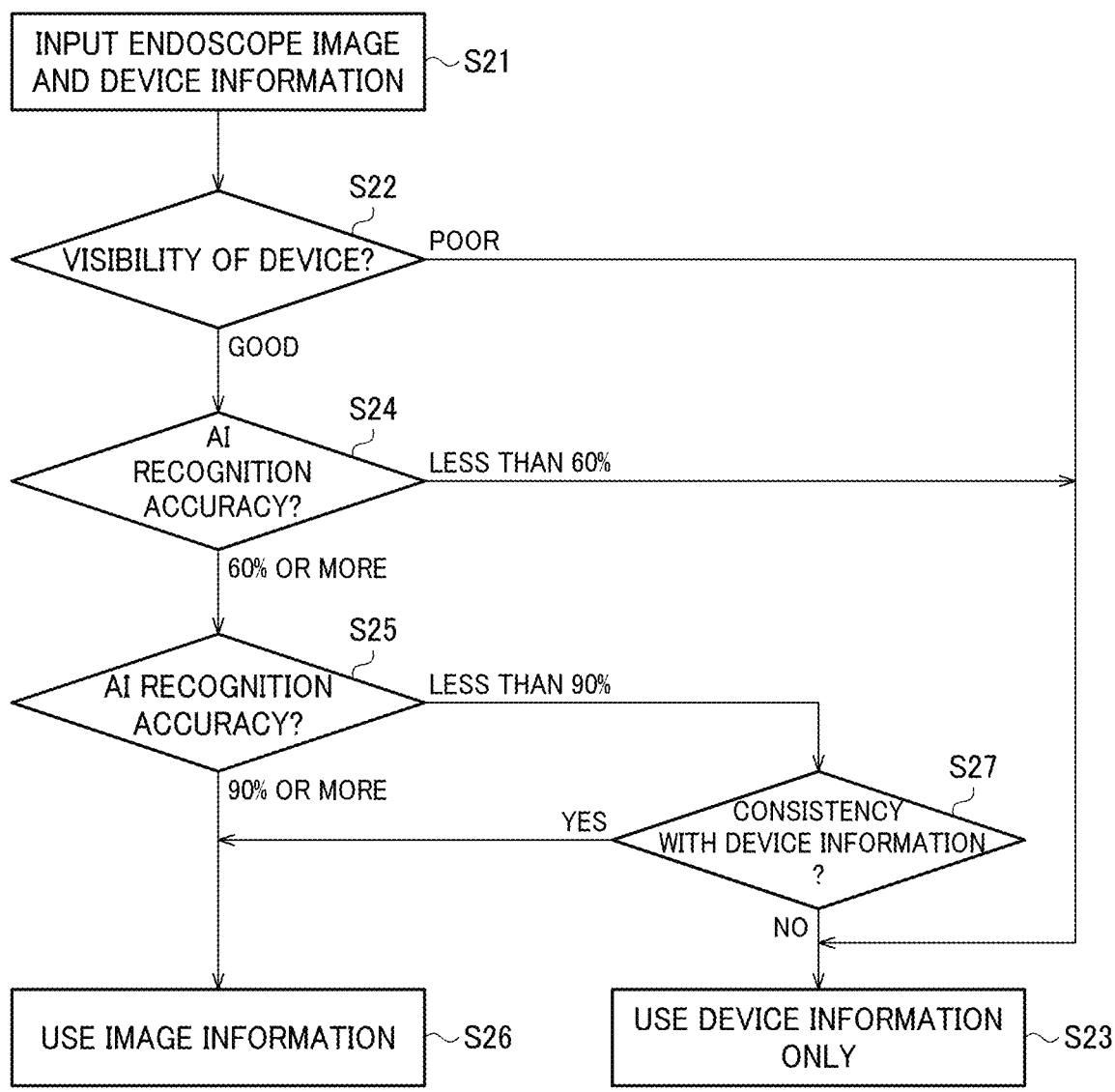
FIG. 30 is a flowchart of processing using both image recognition results and device information.

10. Energy Output Adjustment Using Both Image Recognition Results and Device Information Although the above explanation describes an embodiment in which the control section 110 performs energy output adjustment based on the image recognition results, the control section 110 may use both image recognition results and device information in performing energy output adjustment. FIG. 30 is a flowchart of processing using both image recognition results and device information.

In the step S21, an endoscope image is input to the control section 110 from the main body device 220 of the endoscope system 200 and the device information is input from the generator 300 that controls the energy device 310. Specifically, in FIG. 2, it may be structured such that the I/O device 190 receives the device information from the generator 300 and the received device information is input to the control section 110.

In the step S22, the control section 110 determines the visibility of the energy device 310 from the endoscope image. The control section 110 determines that the visibility of the energy device 310 is poor, for example, when the energy device 310 is facing the depth direction of the image, when the jaw of the energy device 310 is hidden by other treatment tools, or when the amount of mist in the field of view of the endoscope is at a certain level or more. Otherwise, the control section 110 determines that the visibility of the energy device 310 is desirable.

If the visibility of the energy device 310 is determined to be poor in the step S22, in the step S23, the control section 110 determines to use the device information instead of using the image recognition results. That is, if the visibility is poor, the image recognition results are considered unreliable and the control section 110 determines to use the device information. For example, the control section 110 does not output an energy output adjustment instruction based on the image recognition results to the generator 300, and the generator 300 performs output control such as automatic turn-off of output or the like based on impedance information. Alternatively, the control section 110 may output an energy output adjustment instruction to the generator 300 based on the device information. However, judging the tissue information or the treatment information based on the image recognition results enables information judgment more various or more accurate than that in the case of judging the tissue information or the treatment information from the device information. This point is described later with reference to FIGS. 31 to 34, together with an explanation of consistency. If the visibility of the energy device 310 is determined to be desirable in the step S22, in the step S24, the control section 110 determines whether or not the estimation accuracy of the image recognition using machine learning is equal to or more than a first threshold. Herein, the first threshold is 60%.

If the estimation accuracy is determined to be less than 60% in the step S24, in the step S23, the control section 110 determines to use the device information instead of using the image recognition results. That is, if the estimation accuracy is low, the image recognition results are considered unreliable and the control section 110 determines to use the device information. If the estimation accuracy is determined to be 60% or more in the step S23, in the step S25, the control section 110 determines whether or not the estimation accuracy is equal to or more than a second threshold. The second threshold has higher accuracy than that of the first threshold. Herein, the second threshold is 90%.

If the estimation accuracy is determined to be 90% or more in the step S25, in the step S26, the control section 110 gives an energy output adjustment instruction to the generator 300 based on the image recognition results. That is, if the estimation accuracy is sufficiently high, the image recognition results are considered reliable and the image recognition results are used. The generator 300 supplies energy to the energy device 310 according to the output value or the output sequence set by the energy output adjustment instruction. At this time, the generator 300 may perform output control such as automatic turn-off of the output based on the impedance information under the output value or the output sequence set by the energy output adjustment instruction. If the estimation accuracy is determined to be less than 90% in the step S25, in the step S27, the control section 110 judges the consistency between the image recognition results and the device information.

If it is judged that the image recognition results and the device information are consistent in the step S27, in the step S26, the control section 110 outputs an energy output adjustment instruction to the generator 300 based on the image recognition results. That is, even if the estimation accuracy of image recognition is not sufficiently high, if the image recognition results are consistent with the device information, the image recognition results are considered reliable and the image recognition results are used. If it is judged that the image recognition results and the device information are inconsistent in the step S27, in the step S23, the control section 110 determines to use the device information instead of using the image recognition results. That is, if the image recognition results and the device information are inconsistent, the image recognition results are considered unreliable and the control section 110 determines to use the device information.

The device information is electrical information of the tissue that comes in contact with the distal end section of the energy device, e.g., the impedance information of the tissue that comes in contact with the distal end section of the energy device. For example, when the energy device is a bipolar device, the electrical information is the impedance information of the tissue gripped by the two jaws. The generator 300 outputs high-frequency power for use in the treatment to the two jaws of the bipolar device, measures the voltage and the current of the high-frequency power, and acquires the impedance information from the measured voltage and current. However, the electrical information is not limited to the impedance information, but may be any information insofar as it changes according to the tissue type or the progress of the treatment. The electrical information may be, for example, a current, a voltage, or a phase between current and voltage. The electrical information may also be electric power, electric power amount, impedance, resistance, reactance, admittance (reciprocal of impedance), conductance (real number part of admittance), or susceptance (imaginary number part of admittance). The electrical information may also be a value derived from elementary arithmetic, such as the change over time described above, changes between respective parameters, differentiation/integration between respective parameters (when P represents the parameter, the differential over time is dP/dt and the differential by resistance is dP/dR), the sum difference for each set, or the like, or trigger information such as information as to whether the respective threshold values have been crossed.

The estimation accuracy in image recognition refers to the degree of accuracy of estimation result. For example, in the case of a neural network that performs classification, the output layer has a node corresponding to each class, and the probability of correspondence of the input data in the input layer to each class is output to each node of the output layer. The class of the node with the highest probability is output as the classification result, and the probability output to the node is used as the estimation accuracy of the classification result. Alternatively, in an example in which accuracy evaluation is performed in the image recognition process using machine learning, the accuracy is acquired in advance for each treatment scene, and a trained model is generated by having a training model learn the scene and the accuracy together with the tissue information or the treatment information. By the image recognition process using this trained model, the recognition accuracy is output together with the recognition results of the tissue information or the treatment information, and the recognition accuracy is used as the estimation accuracy of the tissue information or the treatment information. The treatment scene is, for example, the scene defined by the gripping direction of the energy device, the scene defined by the scene of manipulation, or the like. The scene defined by the gripping direction is, for example, a scene with the energy device gripping a tissue while facing to the depth direction of the endoscope image, or the like. The scene defined by the scene of manipulation is, for example, a process using an energy device in a subpyloric region, or the like.

The consistency between the image recognition result and the device information refers to whether or not they match predetermined appropriate combination of image recognition information and device information. Specifically, the consistency means whether the tissue information or the treatment information indicated by the image recognition result is consistent with the tissue information or the treatment information indicated by the device information. FIGS. 31 to 34 show examples of the consistency between the image recognition result and the device information. For example, in FIG. 31, if the image recognition result is a thin film or a thick vessel and the device information is low impedance, the image recognition result and the device information are considered consistent. In this case, the control section 110 considers the image recognition result reliable and uses the image recognition result to perform energy output adjustment. In the case of low impedance, a thin film and a blood vessel cannot be distinguished from each other by the impedance information alone; however, by using the image recognition result, the thin film and the blood vessel can be distinguished from each other, thus enabling energy output adjustment. Conversely, if the image recognition result is a thin film or a vessel and the device information is high impedance, the image recognition result and the device information are considered inconsistent. In this case, the control section 110 considers the image recognition result unreliable, and determines to use the device information.

The system 10 of the present embodiment described above includes the storage section 120 that stores the trained model 121 and the control section 110. The trained model 121 is trained to output image recognition information from the training device tissue image or the training tissue image. The training device tissue image is an image in which at least one energy device 310, which receives energy supply and performs energy output, and at least one biological tissue are captured. A training tissue image is an image in which at least one biological tissue is captured. The image recognition information is at least one of the tissue information regarding at least one biological tissue and the treatment information regarding at least one treatment on biological tissue. The control section 110 acquires a captured image in which at least one energy device 310 and at least one biological tissue are captured. The control section 110 estimates the image recognition information from the captured image by processing based on the trained model 121 stored in the storage section 120. The control section 110 outputs an energy output adjustment instruction based on the estimated image recognition information to the generator 300. The generator 300 controls the energy supply amount to the energy device 310 based on the energy output adjustment instruction.

As a result, in some embodiments, the energy output of the energy device 310 is adjusted based on the tissue information or the treatment information obtained by image recognition from the captured image. This makes it possible to adjust the energy output based on various types of information that cannot be determined only from the device information, such as impedance information or the like. For example, as described above in FIG. 31, and the like, the image recognition makes it possible to identify the tissue type that cannot be identified by the impedance information, thereby enabling energy output adjustment according to the identified tissue type.

Further, by using the various types of information obtained by image recognition, it is possible to perform energy output adjustment in consideration of heat diffusion in the treatment with the energy device 310. For example, energy output adjustment, such as adjustment to lower the energy output or the like, is possible when heat diffusion predicted from the tissue information or the treatment information obtained by image recognition is large. Since it enables identification of the information in more detail than when using the device information, it is possible to perform energy output adjustment in consideration of various situations of heat diffusion. The image recognition information, the tissue information, the treatment information, and the energy output adjustment instruction are described, for example, in the section "1. System".

Further, in the present embodiment, the control section 110 may also determine one of the adjustments to increase, decrease, or maintain the energy output from the reference energy output based on the image recognition information, and output the determined adjustment instruction as the energy output adjustment instruction.

As a result, in some embodiments, the energy output is increased, decreased, or maintained based on the image recognition information; in this way, the energy output can be increased, decreased, or maintained according to the heat diffusion predicted from the image recognition information. For example, if a long energy application time is expected based on the image recognition information, the energy output can be increased to shorten the energy application time to reduce heat diffusion. The "adjustment to increase, decrease, or maintain the energy output from the reference energy output" is described, for example, in the section "4. Example of Processing When Recognizing Tissue Type".

In the present embodiment, the control section 110 may also output the energy output adjustment instruction using the preset energy output or real-time energy output of the generator 300 as the reference energy output.

The expression "preset energy output" refers to setting the reference energy output for energy output adjustment in advance; therefore, a fixed reference energy output is used regardless of the real-time energy output. The "real-time energy output" refers to the energy output set in the generator 300 at the time when the control section 110 outputs the energy output adjustment instruction. That is, the reference energy output may be different each time.

In the present embodiment, the control section 110 may also acquire an endoscope image from the endoscope 210 as a captured image and output an energy output adjustment instruction using the energy output set at the time when the endoscope image was acquired as the reference energy output.

The "energy output set at the time when the endoscope image was acquired" refers to the energy output that was set at the time when the endoscope image was acquired upon the output of the energy output adjustment instruction based on the image recognition information from the endoscope image.

Further, in the present embodiment, the energy device 310 may be a device that includes two jaws capable of gripping a tissue and that receives energy supply from the generator 300 and performs energy output from the two jaws.

That is, the energy device 310 may be a bipolar device 330. The bipolar device is described, for example, in FIG. 5 in the section "3. Energy Device".

Further, in the present embodiment, the tissue information may include the tissue type or tissue condition of the tissue to be treated by the at least one energy device.

As a result, in some embodiments, the energy output of the energy device 310 is adjusted based on the tissue type or the tissue condition obtained by image recognition from the captured image. The degree of heat diffusion upon the treatment by the energy device 310 differs depending on the tissue type or the tissue condition. By using the tissue type or the tissue condition obtained by image recognition, it is possible to perform energy output adjustment in consideration of heat diffusion under the tissue type or tissue condition. The tissue type is described, for example, in the section "4. Example of Processing When Recognizing Tissue Type". The tissue condition is described, for example, in the section "5. Example of Processing When Recognizing Tissue Condition".

Further, in the present embodiment, the treatment information may include the amount of tissue gripped by the at least one energy device, or the amount of tissue traction by the at least one energy device or another device.

As a result, in some embodiments, the energy output of the energy device 310 is adjusted based on the amount of gripped tissue or amount of tissue traction obtained by image recognition from the captured image. The degree of heat diffusion upon the treatment by the energy device 310 differs depending on the amount of gripped tissue or amount of tissue traction. By using the amount of gripped tissue or amount of tissue traction obtained by image recognition, it is possible to perform energy output adjustment in consideration of heat diffusion under the gripping amount or traction amount. The amount of gripped tissue is described, for example, in the section "6. Example of Processing When Recognizing Amount of Gripped Tissue". The traction of tissue is described, for example, in the section "7. Example of Processing When Recognizing Tissue Tension".

Further, in the present embodiment, the treatment information may include the tension of the tissue treated by the at least one energy device, or the distance between the at least one energy device and an attention object.

As a result, in some embodiments, the energy output of the energy device 310 is adjusted based on the tissue tension or the distance between the energy device and the attention object obtained by image recognition from the captured image. The degree of heat diffusion upon the treatment by the energy device 310 differs depending on the tissue tension and the distance between the energy device and the attention object. By using the tissue tension or the distance between the energy device and the attention object obtained by image recognition, it is possible to perform energy output adjustment in consideration of heat diffusion under the tissue tension and the distance between the energy device and the attention object. The tissue tension is described, for example, in the section "7. Example of Processing When Recognizing Tissue Tension". The distance between the energy device and the attention object is described, for example, in the section "8. Example of Processing When Recognizing Distance Between Treatment Tool Distal End Section and Attention Object".

Further, in the present embodiment, the control section 110 may change priority of use of the image recognition information and electrical information obtained from the at least one energy device 310 in controlling energy output based on the estimation accuracy in the estimation of the image recognition information.

As a result, in some embodiments, the priority between energy output adjustment based on the image recognition information and energy output control based on the electrical information without energy output adjustment based on the image recognition information is changed according to the estimation accuracy. This allows control over which of the above adjustment/control is given priority, depending on whether or not the image recognition information is reliable. The "energy output control" need not necessarily be performed by the control section 110. For example, when the image recognition information is given priority, the control section 110 may output an energy output adjustment instruction based on the image recognition information, and when the electrical information is given priority, the generator 300 may control energy output based on the electrical information. In the latter case, the control section 110 determines not to output an energy output adjustment instruction based on the image recognition information; this means that the use of electrical information is prioritized. The change of priority in use is described, for example, in the section "10. Energy Output Adjustment Using Both Image Recognition Results and Device Information".

Further, in the present embodiment, the control section 110 may also acquire electrical information from the at least one energy device 310. The control section 110 may change priority of use of the image recognition information and the electrical information in controlling the energy output, based on consistency of the image recognition information and the electrical information.

As a result, in some embodiments, it is possible to determine whether or not the image recognition information is reliable based on the consistency of the image recognition information and the electrical information. This allows control over which of the image recognition information and the electrical information is given priority, depending on whether or not the image recognition information is reliable. The consistency of the image recognition information and the electrical information is described, for example, in the section of "10. Energy Output Adjustment Using Both Image Recognition Results and Device Information".

Further, in the present embodiment, the control section 110 displays the captured image, and at least one of the content of the image recognition information and the content of the energy output adjustment instruction on a display section.

As a result, in some embodiments, the user will understand what processing has been performed inside the device during the automatic control of energy output by viewing at least one of the content of the image recognition information and the content of the energy output adjustment instruction displayed on the display section. The display section on which the information is displayed may be either the display 230 of the endoscope system 200 or a display provided elsewhere. The display is described, for example, in the section "9. Display Example".

Further, in the present embodiment, the trained model 121 may include the first trained model and the second trained model. The first trained model is trained to detect a bounding box indicating the distal end section of the at least one energy device from the training device tissue image. The second trained model is trained to output the image recognition information from the training device tissue image in the bounding box. The control section 110 detects the bounding box from the captured image by processing based on the first trained model and estimates the image recognition information from the captured image in the bounding box by processing based on the second trained model.

As a result, in some embodiments, by combining detection and classification or regression using machine learning, it is possible to perform image recognition of the tissue information or the treatment information from a captured image. This processing is described, for example, in FIG. 10 in the section "4. Example of Processing When Recognizing Tissue Type", FIG. 14 in the section "5. Example of Processing When Recognizing Tissue Condition", FIG. 19 in the section "6. Example of Processing When Recognizing Amount of Gripped Tissue", FIG. 24 in the section "7. Example of Processing When Recognizing Tissue Tension", and the like.

Further, in the present embodiment, the trained model 121 may be a model trained to detect each biological tissue region of at least one biological tissue from the training device tissue image or the training tissue image, and detect a distal end section region of the at least one energy device from the training device tissue image. The control section 110 may detect each biological tissue region and the distal end section region from the captured image by processing based on the trained model 121, and estimate image recognition information based on each of the detected biological tissue region and distal end section region.

As a result, in some embodiments, it is possible to perform image recognition of the tissue information or the treatment information from a captured image by segmentation using machine learning. This processing is described, for example, in FIG. 9 in the section "4. Example of Processing When Recognizing Tissue Type", FIGS. 13 to 15 in the section "5. Example of Processing When recognizing Tissue Condition", and the like.

Further, in the present embodiment, the system 10 may include at least one energy device 310 and the generator 300.

Further, in the present embodiment, the system 10 may include the endoscope 210 that captures an endoscope image as the captured image. The control section 110 may acquire an endoscope image from the endoscope 210 and estimate image recognition information from the endoscope image by processing based on the trained model 121.

Further, the above processing may also be written as a program. Specifically, the program of the present embodiment causes a computer to acquire a captured image, estimate image recognition information from the captured image by processing based on the trained model 121, and output an energy output adjustment instruction based on the estimated image recognition information to the generator 300.

Further, the above processing may also be performed as an energy output adjustment method. Specifically, the energy output adjustment method of the present embodiment includes acquiring a captured image, estimating image recognition information from the captured image by processing based on the trained model 121, and outputting an energy output adjustment instruction based on the estimated image recognition information to the generator 300.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

The invention claimed is:

1. A system comprising:
    a memory storing a trained model trained so as to output image recognition information from a training device tissue image or a training tissue image, the image recognition information being at least one of tissue information about at least one biological tissue or treatment information about treatment on the at least one biological tissue, the training device tissue image being an image of at least one energy device for performing energy output by receiving energy supply and the at least one biological tissue, the training tissue image being an image of the at least one biological tissue; and
    a processor,
    the processor being configured to perform:
    acquiring a captured image that is an image of the at least one energy device and the at least one biological tissue;
    executing processing based on the trained model stored in the memory to estimate the image recognition information from the captured image; and
    outputting an energy output adjustment instruction based on the estimated image recognition information to a generator that controls an energy supply amount to the energy device based on the energy output adjustment instruction,
    the trained model comprising:
    a first trained model trained to detect a bounding box indicating a distal end section of the at least one energy device from the training device tissue image; and
    a second trained model trained to output the image recognition information from the training device tissue image in the bounding box,
    the processor, in the estimating, detecting the bounding box from the captured image by processing based on the first trained model and estimating the image recognition information from the captured image in the bounding box by processing based on the second trained model.

2. The system as defined in claim 1, wherein the processor performs:
    determining any of adjustments of increasing, reducing, and maintaining the energy output from a reference energy output based on the image recognition information; and outputting an instruction for the determined adjustment as the energy output adjustment instruction.

3. The system as defined in claim 2, wherein the processor performs
outputting the energy output adjustment instruction using a preset energy output or the energy output of the generator in real time as the reference energy output.

4. The system as defined in claim 2, wherein the processor performs:
acquiring an endoscope image from an endoscope as the captured image; and
outputting the energy output adjustment instruction using the energy output set at the time point when the endoscope image was acquired as the reference energy output.

5. The system as defined in claim 1, wherein
the energy device is a device that includes two jaws capable of gripping a tissue and that receives the energy supply from the generator and performs energy output from the two jaws.

6. The system as defined in claim 1, wherein
the tissue information includes tissue type or tissue condition of a tissue to be treated by the at least one energy device.

7. The system as defined in claim 1, wherein
the treatment information includes an amount of tissue gripped by the at least one energy device, or an amount of tissue traction by the at least one energy device or another device.

8. The system as defined in claim 1, wherein
the treatment information includes tension of a tissue treated by the at least one energy device, or a distance between the at least one energy device and an attention object.

9. The system as defined in claim 1, wherein
the processor changes priority of use of the image recognition information and electrical information obtained from the at least one energy device in controlling the energy output, based on estimation accuracy upon estimation of the image recognition information.

10. The system as defined in claim 1, wherein
the processor performs:
acquiring electrical information from the at least one energy device; and
changing priority of use of the image recognition information and the electrical information in controlling the energy output, based on consistency of the image recognition information and the electrical information.

11. The system as defined in claim 1, wherein
the processor performs
displaying the captured image and at least one of the content of the image recognition information and the content of the energy output adjustment instruction on a display.

12. The system as defined in claim 1, wherein
the trained model is trained to detect each biological tissue region of the at least one biological tissue from the training device tissue image or the training tissue image, and detect a distal end section region of the at least one energy device from the training device tissue image, and
the processor performs:
detecting the each biological tissue region and the distal end section region from the captured image by processing based on the trained model; and
estimating the image recognition information based on the detected each biological tissue region and the distal end section region.

13. The system as defined in claim 1, further comprising:
the at least one energy device; and
the generator.

14. The system as defined in claim 13, further comprising an endoscope that captures an endoscope image as the captured image,
wherein the processor performs:
acquiring the endoscope image from the endoscope; and
estimating the image recognition information from the endoscope image by processing based on the trained model.

15. A computer-readable non-transitory information storage medium storing a program for causing a computer to execute:
acquiring a captured image, which is an image of at least one energy device that receives energy supply and performs energy output and at least one biological tissue;
estimating image recognition information from the captured image by processing based on a trained model trained to output the image recognition information from a training device tissue image or a training tissue image, the image recognition information being at least one of tissue information about the at least one biological tissue or treatment information about treatment on the at least one biological tissue, the training device tissue image being an image of the at least one energy device and the at least one biological tissue, the training tissue image being an image of the at least one biological tissue;
outputting an energy output adjustment instruction based on the estimated image recognition information to a generator that controls an energy supply amount to the energy device based on the energy output adjustment instruction; and
in the estimating, detecting a bounding box from the captured image by processing based on a first trained model included in the trained model and estimating the image recognition information from the captured image in the bounding box by processing based on a second trained model included in the trained model, the first trained model being a model trained to detect the bounding box indicating a distal end section of the at least one energy device from the training device tissue image, the second trained model being a model trained to output the image recognition information from the training device tissue image in the bounding box.

16. The computer-readable non-transitory information storage medium as defined in claim 15, which stores a program for causing a computer to execute: determining any of adjustments of increasing, reducing, and maintaining the energy output from a reference energy output based on the image recognition information; and outputting an instruction for the determined adjustment as the energy output adjustment instruction.

17. The computer-readable non-transitory information storage medium as defined in claim 16, which stores a program for causing a computer to execute outputting the energy output adjustment instruction using a preset energy output or the energy output of the generator in real time as the reference energy output.

18. An energy output adjustment method, comprising:

acquiring a captured image, which is an image of at least one energy device that receives energy supply and performs energy output and at least one biological tissue; and estimating image recognition information from the captured image by processing based on a trained model trained to output the image recognition information from a training device tissue image or a training tissue image, the image recognition information being at least one of tissue information about the at least one biological tissue or treatment information about treatment on the at least one biological tissue, the training device tissue image being an image of the at least one energy device and the at least one biological tissue, the training tissue image being an image of the at least one biological tissue;

outputting an energy output adjustment instruction based on the estimated image recognition information to a generator that controls an energy supply amount to the energy device based on the energy output adjustment instruction; and in the estimating, detecting a bounding box from the captured image by processing based on a first trained model included in the trained model and estimating the image recognition information from the captured image in the bounding box by processing based on a second trained model included in the trained model, the first trained model being a model trained to detect the bounding box indicating a distal end section of the at least one energy device from the training device tissue image, the second trained model being a model trained to output the image recognition information from the training device tissue image in the bounding box.

19. The energy output adjustment method as defined in claim 18, further comprising:

determining any of adjustments of increasing, reducing, and maintaining the energy output from a reference energy output based on the image recognition information; and outputting an instruction for the determined adjustment as the energy output adjustment instruction.

20. The energy output adjustment method as defined in claim 19, further comprising outputting the energy output adjustment instruction using a preset energy output or the energy output of the generator in real time as the reference energy output.

* * * * *